(12) United States Patent
Ueno et al.

(10) Patent No.: US 10,981,581 B2
(45) Date of Patent: Apr. 20, 2021

(54) DISPLAY DEVICE

(71) Applicant: OMRON Corporation, Kyoto (JP)

(72) Inventors: Hiroki Ueno, Kyoto (JP); Norikazu Kitamura, Osaka (JP)

(73) Assignee: OMRON Corporation, Kyoto (JP)

( * ) Notice: Subject to any disclaimer, the term of this patent is extended or adjusted under 35 U.S.C. 154(b) by 414 days.

(21) Appl. No.: 16/014,547

(22) Filed: Jun. 21, 2018

(65) Prior Publication Data

US 2019/0077416 A1     Mar. 14, 2019

(30) Foreign Application Priority Data

Sep. 14, 2017 (JP) .............................. JP2017-177029

(51) Int. Cl.
*B60W 50/14* (2020.01)
*F21V 8/00* (2006.01)
*B60K 35/00* (2006.01)
*H04N 13/363* (2018.01)

(52) U.S. Cl.
CPC ............. *B60W 50/14* (2013.01); *B60K 35/00* (2013.01); *G02B 6/006* (2013.01); *G02B 6/0011* (2013.01); *G02B 6/0036* (2013.01); *G02B 6/0076* (2013.01); *B60W 2050/143* (2013.01); *B60W 2050/146* (2013.01); *H04N 13/363* (2018.05)

(58) Field of Classification Search
CPC ...... G03B 21/10; G03B 21/56; G03B 21/145; G03B 21/208; G03B 21/562; G03B 21/2053; G02B 6/005; G02B 6/006; G02B 6/0011; G02B 6/0036; G02B 6/0076; B60W 50/0097; B60W 50/08; B60W 50/14
See application file for complete search history.

(56) References Cited

U.S. PATENT DOCUMENTS

| | | | |
|---|---|---|---|
| 2009/0243822 A1 | 10/2009 | Hinninger et al. | |
| 2018/0134285 A1* | 5/2018 | Cho | B60Q 9/00 |
| 2018/0170327 A1* | 6/2018 | Lee | B60T 7/22 |
| 2019/0077416 A1* | 3/2019 | Ueno | G02B 6/0036 |

FOREIGN PATENT DOCUMENTS

| | | |
|---|---|---|
| JP | 2009-245427 A | 10/2009 |
| JP | 2016-49897 A | 4/2016 |

* cited by examiner

*Primary Examiner* — Sultan Chowdhury
(74) *Attorney, Agent, or Firm* — Metrolex IP Law Group, PLLC

(57) ABSTRACT

A display device includes an image display unit that displays a first alert image in response to an alert at a first level, an image projection unit that displays a second alert image in response to an alert at a second level. The second image display unit overlaps the first image display unit. The first alert image appears at a position different from a surface of the second image display unit.

10 Claims, 19 Drawing Sheets

FIG. 10A
FIG. 10B
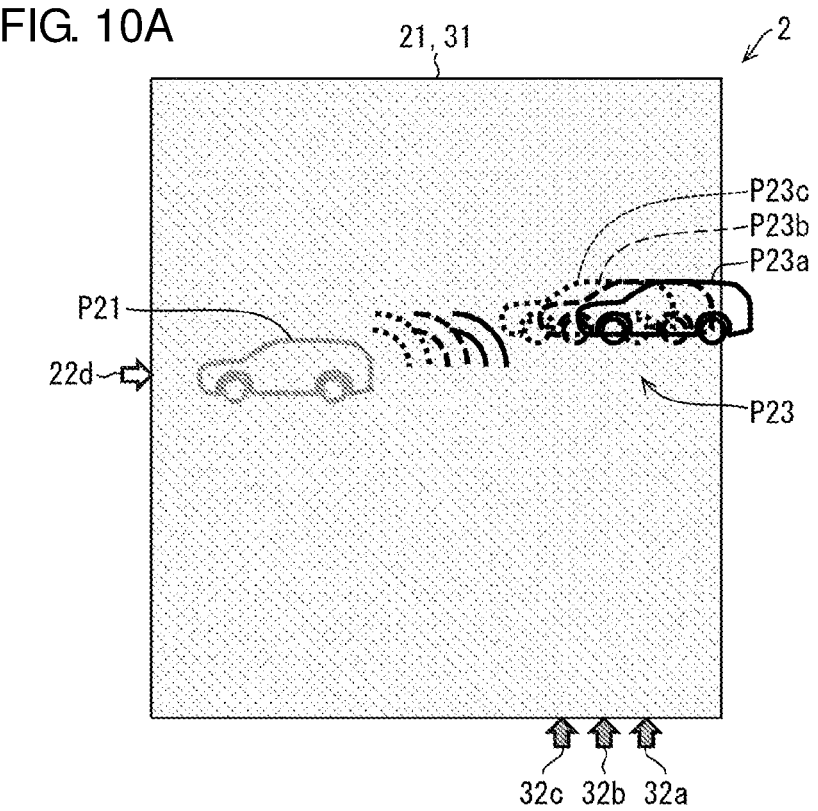
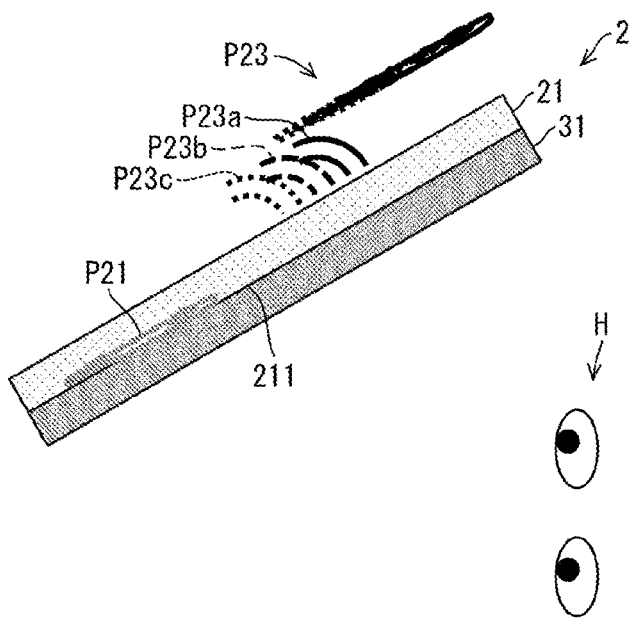

DISPLAY DEVICE

CROSS REFERENCE TO RELATED APPLICATIONS

This application claims priority from prior Japanese Patent Application No. 2017-177029 filed with the Japan Patent Office on Sep. 14, 2017, the entire contents of which are incorporated herein by reference.

FIELD

The present disclosure relates to a display device for displaying an alert to a user.

BACKGROUND

A driving assist device described in Patent Literature 1, which is installed on an interior material in a vehicle cabin, includes a transparent display panel having light guide grooves for guiding light, and a light source for emitting light toward the light guide grooves from outside the display panel when an obstacle outside the vehicle cabin is detected. The driving assist device described in Patent Literature 1 may alert the driver using light that blinks faster as the vehicle approaches the obstacle.

A warning system described in Patent Literature 2 alerts a driver by transmitting information about an object detected in a vehicle blind spot and information about the vehicle blind spot. The warning system described in Patent Literature 2 includes a detection area divided into multiple sections. The system changes the blinking frequency of a light emitting indicator based on the section in which the detected object is located.

A display device for displaying a warning also uses a technique for changing the image area for displaying a warning in accordance with the warning level.

CITATION LIST

Patent Literature

Patent Literature 1: Japanese Unexamined Patent Application Publication No. 2016-49897 (published on Apr. 11, 2016)

Patent Literature 2: Japanese Unexamined Patent Application Publication No. 2009-245427 (published on Oct. 22, 2009)

SUMMARY

Technical Problem

However, the above known systems may not sufficiently emphasize an alert level selectively from multiple alert levels.

One or more aspects of the present disclosure are directed to a display device that can display an alert in an emphasized manner.

Solution to Problem

In response to the above issue, the device according to one or more aspects of the present disclosure has the structure described below.

A display device according to an aspect of the present disclosure is a display device for displaying an alert image representing an alert at one of a plurality of alert levels to a user. The device includes a first image display unit that displays a first alert image in response to an alert at a first level included in the plurality of alert levels, and a second image display unit that displays a second alert image in response to an alert at a second level included in the plurality of alert levels. The second image display unit overlaps the first image display unit. The first image display unit is a stereoscopic projection device that forms an image in a space, and forms the first alert image in a space different from a surface of the second image display unit.

In the display device with the above structure, the second image display unit overlaps the first image display unit. The first image display unit displays a first alert image in response to an alert at a first alert level, and the second image display unit displays a second alert image in response to an alert at a second alert level. The first image display unit is a stereoscopic projection device that forms an image in a space, and forms the first alert image in a space different from a surface of the second image display unit.

This display device forming the first alert image in a space different from the surface of the second image display unit can emphasize an alert at a selected alert level for the user. In other words, the display device provides the different alert levels to be distinguished by the user by forming the images at different positions.

In the display device according to an aspect, the first image display unit may be a stereoscopic projection device including a first light source and a first light guide plate that guides light from the first light source and emits the light through a light emission surface to form an image in a space. The second image display unit may be an image display device that displays an image on a surface.

In the display device with the above structure, the first image display unit forms an image in a space using light emitted from the first light source. The second image display unit displays an image on its surface. The first image display unit may thus form an image in a space different from the surface of the second image display unit.

In the display device according to an aspect, the second image display unit may be a plane image display device including a second light source and a second light guide plate that guides light from the second light source to form an image inside the second light guide plate. In the second image display unit with the above structure, light from the second light source is guided through the second light guide plate to form an image inside the second light guide plate.

In the display device according to an aspect, the second light source may emit light into the second light guide plate in a direction orthogonal to a direction in which the first light source emits light into the first light guide plate.

The display device with the above structure reduces the possibility that the first image display unit may form an image in a space when light from the second light source partially enters the first light guide plate.

In the display device according to an aspect, the first image display unit may be a stereoscopic projection device including a first light source and a first light guide plate that guides light from the first light source and emits the light through a light emission surface to form an image in a space. The second image display unit may be a stereoscopic projection device including a second light source and a second light guide plate that guides light from the second light source and emits the light through a light emission surface to form an image in a space. The second alert image may appear in a space different from a space in which the first alert image appears. The display device with the above structure allows the first alert image and the second alert image to appear in spaces different from each other.

The display device according to an aspect may be installed on a vehicle. The display device may display the first alert image or the second alert image in accordance with the alert level determined in accordance with a distance between the vehicle and an object when the distance is smaller than or equal to a predetermined amount. The display device with the above structure may be used to display an alert in accordance with the distance between the vehicle and another object.

Advantageous Effects

The display device according to one or more aspects can display an alert in an emphasized manner.

BRIEF DESCRIPTION OF THE DRAWINGS

FIG. 10A is a front view illustrating a display device showing a display example in operation 2 at a first alert level, and FIG. 10B is a side view illustrating a display device showing a display example in operation 2 at a first alert level.

DETAILED DESCRIPTION

First Embodiment

An embodiment will be described with reference to the drawings.

1. Example Use

Figure 1:
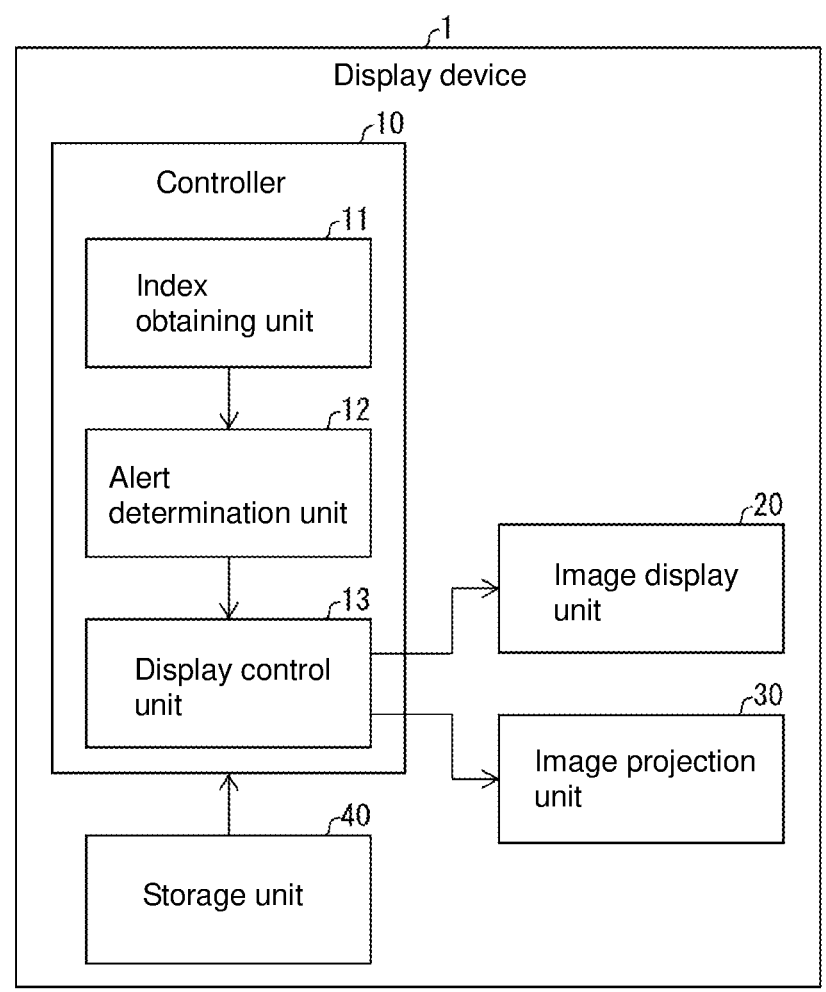
FIG. 1 is a schematic block diagram illustrating a display device according to a first embodiment.

FIG. 1 is a schematic block diagram of a display device 1 according to an embodiment. The display device 1 displays alert images representing alerts at multiple levels to a user H. As shown in FIG. 1, the display device 1 includes a controller 10, an image display unit 20 (a second image display unit or a plane image display), an image projection unit 30 (a first image display unit or a stereoscopic projection device), and a storage unit 40.

The controller 10 controls the operation of the display device 1. The controller 10 includes an index obtaining unit 11, an alert determination unit 12, and a display control unit 13. The index obtaining unit 11 obtains an index for determining an alert level from an external device that detects the index. The display device 1 may also include a device that obtains an index for determining an alert level.

The alert determination unit 12 determines an alert level based on an index obtained by the index obtaining unit 11. The display control unit 13 controls the image display unit 20 and the image projection unit 30 to display an alert image corresponding to the alert level determined by the alert determination unit 12. The controller 10 may be implemented using a logic circuit (hardware) such as an integrated circuit (IC chip) or using software. The controller 10 may be external to the display device 1.

The storage unit 40 stores information used for control by the controller 10. The storage unit 40 may be included in an external device separate from the display device 1.

2. Structure

Figure 2A:
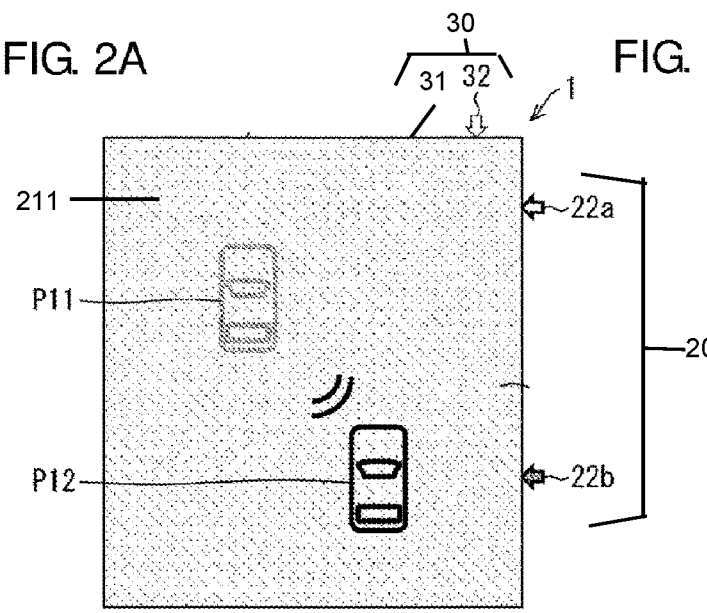
FIG. 2A is a front view illustrating a display device showing a display example at a first alert level according to a first embodiment.
Figure 2B:
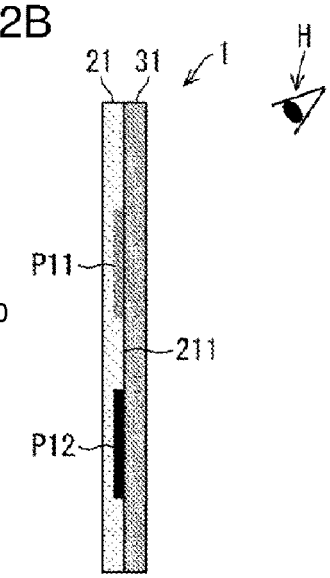
FIG. 2B is a side view illustrating a display device showing a display example at a first alert level according to a first embodiment.
Figure 2C:
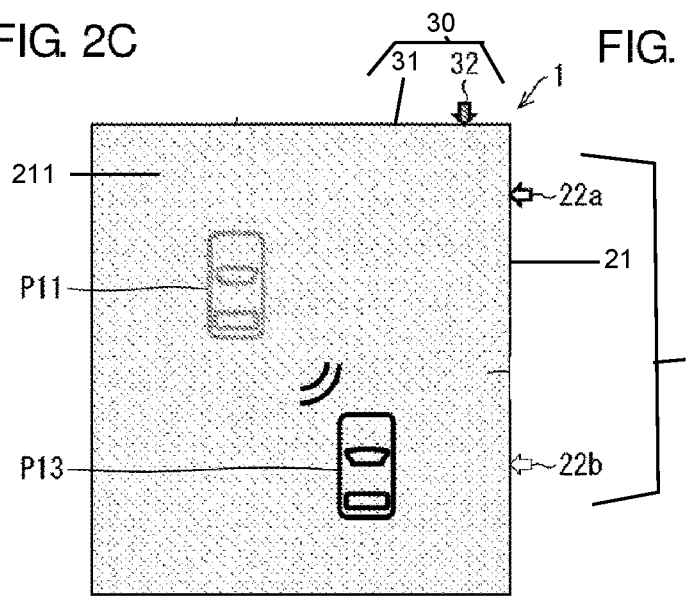
FIG. 2C is a front view illustrating a display device showing a display example at a first alert level according to a first embodiment.
Figure 2D:
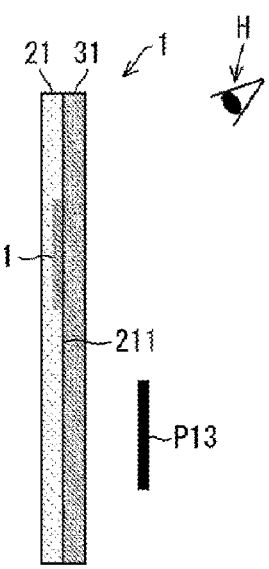
FIG. 2D is a side view illustrating a display device showing a display example at a first alert level according to a first embodiment.

FIG. 2A is a front view of the display device 1 showing a display example at a first alert level. FIG. 2B is a side view of the display device 1 showing the display example at the first alert level. FIG. 2C is a front view of the display device 1 showing a display example at a second alert level. FIG. 2D is a side view of the display device 1 showing the display example at the second alert level. The controller 10 is not shown in FIGS. 2A to 2D.

The index obtaining unit 11 in the display device 1 obtains the distance between the vehicle 110 and another vehicle traveling in an adjacent lane behind the vehicle 110 from a distance measuring device (not shown) included in the vehicle 110. When the distance between the vehicles is not less than a predetermined threshold, the alert determination unit 12 determines that the alert is at a first level. When the distance between the vehicles is less than the predetermined threshold, the alert determination unit 12 determines that the alert is at a second level. More specifically, an alert is at the first level when the vehicles are far apart, and at the second level when the vehicles are close to each other.

In the examples shown in FIGS. 2A to 2D, the image display unit 20 includes a light guide plate 21 (second light guide plate) and two light-emitting diodes (LEDs) 22a and 22b (second light source). The light guide plate 21 is a transparent plate, and contains optical path changers (not shown) for redirecting light. The image projection unit 30 includes a light guide plate 31 (first light guide plate) and an LED 32 (first light source). The structure of the image projection unit 30 will be described in detail later. The light guide plates 21 and 31 overlap each other. Multiple light guide plates overlapping one another herein refer to images displayed or formed by the multiple light guide plates at least partially superimposed as viewed from the user H.

The image display unit 20 displays an image P11 representing the vehicle 110 and an image P12 (second alert image) representing another vehicle. More specifically, the image display unit 20 displays, on a surface 211 of the light guide plate 21, the image P11 when the LED 22a is turned on, and the image P12 when the LED 22b is turned on. The image projection unit 30 forms an image P13 (first alert image) representing the other vehicle when an LED 32 is turned on. The image display unit 20 may display an image on a predetermined internal display surface other than the surface 211 of the light guide plate 21.

As shown in FIGS. 2A to 2D, the LEDs 22a and 22b emit light from the lateral side into the light guide plate 21. The LED 32 emits light from above into the light guide plate 31. The image projection unit 30 thus forms an image in a space using the light entering the light guide plate 31 from the LED 32 and converging in a set of lines in the horizontal direction parallel to the user's right and left eyes. The LEDs 22a and 22b emit light into the light guide plate 21 in a direction perpendicular to the direction in which the LED 32 emits light into the light guide plate 31. This structure reduces the possibility that the image projection unit 30 may form an image in a space when light from the LEDs 22a and 22b partially enters the light guide plate 31. The LED 32 may emit light from below into the light guide plate 31.

The structure of the image projection unit 30 will be described with reference to FIGS. 3 to 7. The image projection unit 30 forms a stereoscopic image viewable by a user in a screenless space.

Figure 3:
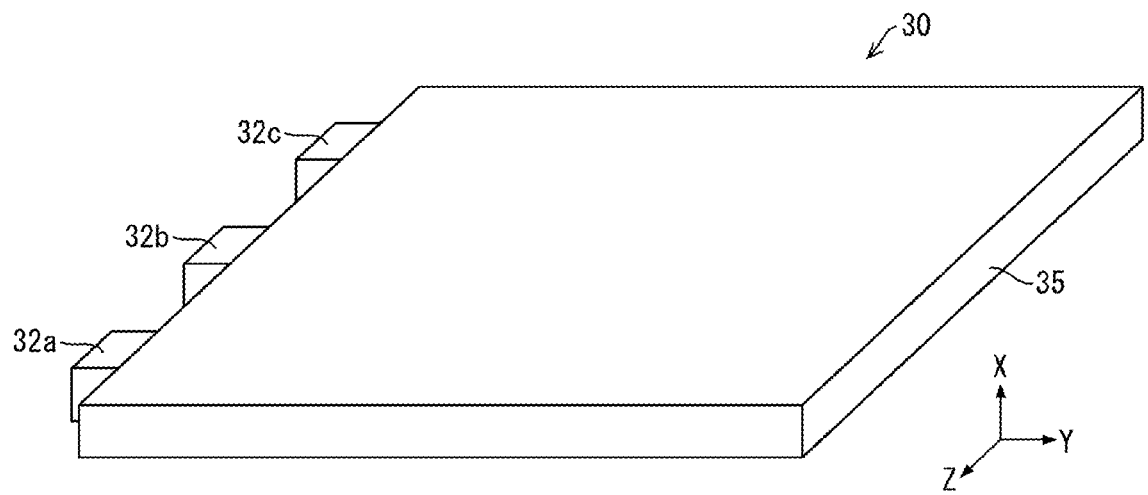
FIG. 3 is a perspective view illustrating an example image projection unit.
Figure 4:
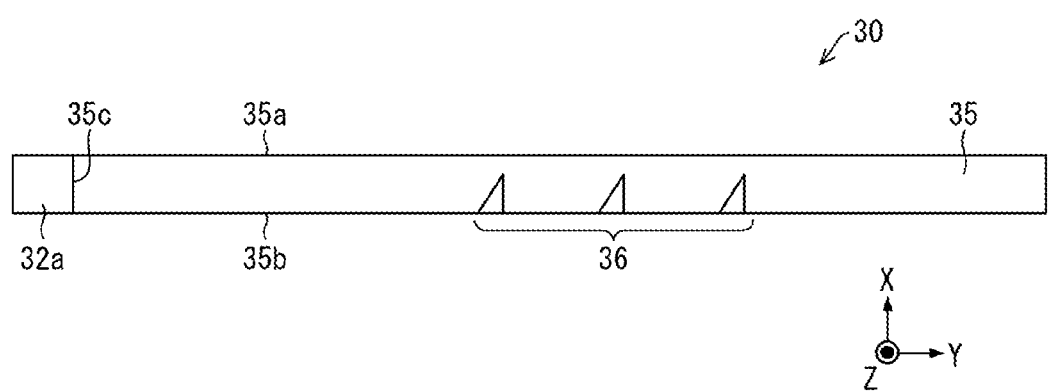
FIG. 4 is a cross-sectional view illustrating an image projection unit.
Figure 5:
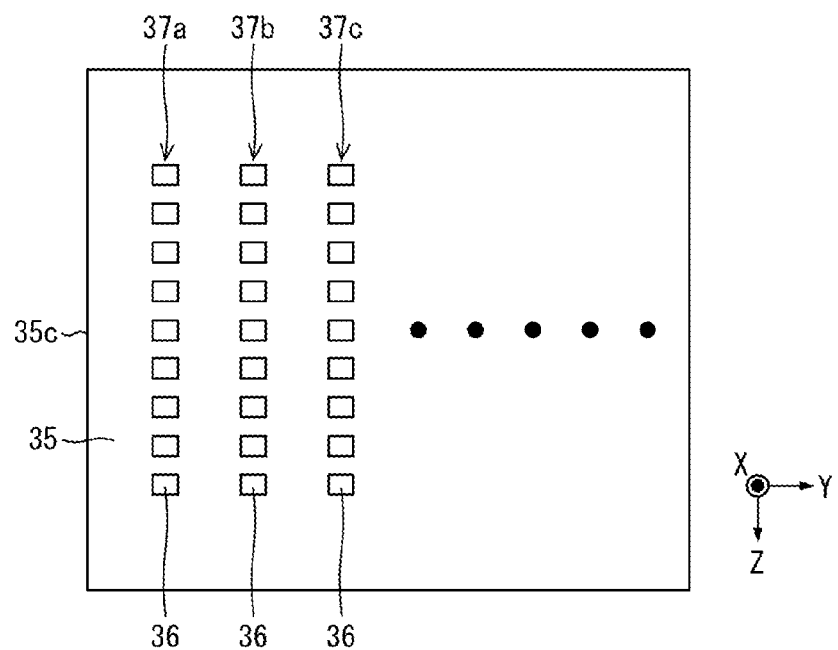
FIG. 5 is a plan view illustrating an image projection unit.
Figure 6:
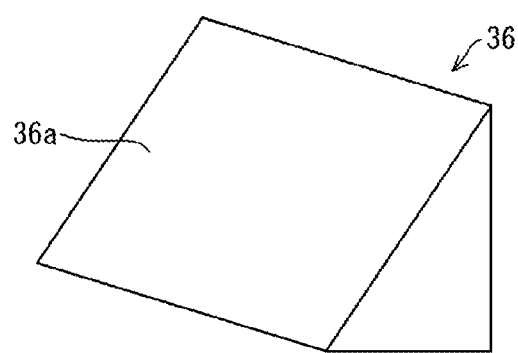
FIG. 6 is a perspective view illustrating an optical path changer included in an image projection unit.

FIG. 3 is a perspective view of an example image projection unit 30. FIG. 4 is a cross-sectional view of the image projection unit 30. FIG. 5 is a plan view of the image projection unit 30. FIG. 6 is a perspective view of an optical path changer 36 included in the image projection unit 30.

As shown in FIGS. 3 and 4, the image projection unit 30 includes three LEDs 32a, 32b, and 32c and the light guide plate 35. The LEDs 32a, 32b, and 32c are arranged in Z-direction.

The light guide plate 35 guides light (incident light) from the LEDs 32a, 32b, and 32c. The light guide plate 35 is formed from a transparent resin material with a relatively high refractive index. The material for the light guide plate 35 may be a polycarbonate resin or a polymethyl methacrylate resin. In a modification, the light guide plate 35 is formed from a polymethyl methacrylate resin. As shown in FIG. 4, the light guide plate 35 has an emission surface (light emission surface) 35a, a back surface 35b, and an incident surface 35c.

The emission surface 35a emits light guided within the light guide plate 35 and redirected by the optical path changers 36 (described later). The emission surface 35a is a front surface of the light guide plate 35. The back surface 35b is parallel to the emission surface 35a, and has the optical path changers 36 (described later) arranged on it. The incident surface 35c receives light emitted from the LEDs 32a, 32b, and 32c, which then enters the light guide plate 35. The light emitted from the LEDs 32a, 32b, and 32c enters the light guide plate 35 through the incident surface 35c. The light is then totally reflected by the emission surface 35a or the back surface 35b and guided within the light guide plate 35.

As shown in FIG. 4, the optical path changers 36 are arranged on the back surface 35b and inside the light guide plate 35. The optical path changers 36 redirect the light guided within the light guide plate 35 to be emitted through the emission surface 35a. The multiple optical path changers 36 are arranged on the back surface 35b of the light guide plate 35.

As shown in FIG. 5, the optical path changers 36 are arranged parallel to the incident surface 35c. As shown in FIG. 6, each optical path changer 36 is a triangular pyramid and has a reflective surface 36a that reflects (totally reflects) incident light. The optical path changer 36 may be, for example, a recess in the back surface 35b of the light guide plate 35. The optical path changer 36 may not be a triangular pyramid. As shown in FIG. 5, the light guide plate 35 includes multiple sets of optical path changers 37a, 37b, 37c, and other sets on its back surface 35b. Each set includes multiple optical path changers 36.

Figure 7:
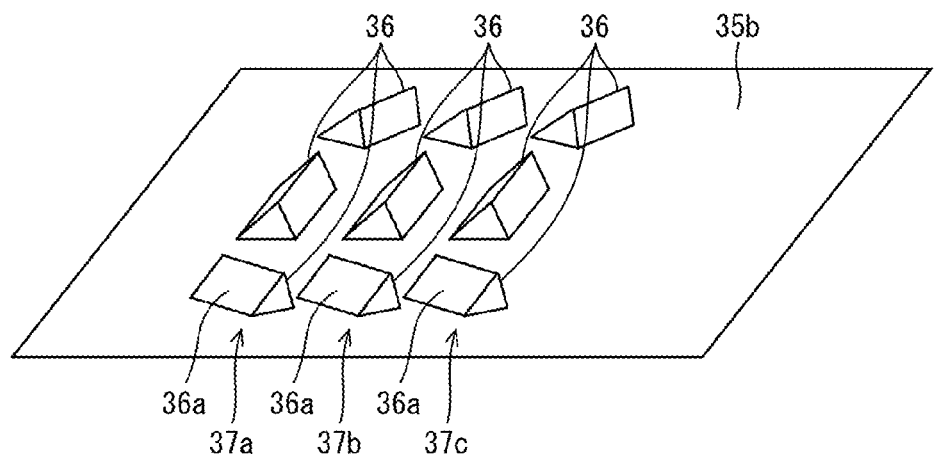
FIG. 7 is a perspective view illustrating optical path changers showing their arrangement.

FIG. 7 is a perspective view of the optical path changers 36 showing their arrangement. As shown in FIG. 7, the optical path changer sets 37a, 37b, 37c, and other sets each include multiple optical path changers 36 arranged on the back surface 35b of the light guide plate 35 with different reflective surfaces 36a forming different angles with the direction of incident light. This arrangement enables the optical path changer sets 37a, 37b, 37c, and other sets to redirect incident light to be emitted in various directions through the emission surface 35a.

The formation of a stereoscopic image by the image projection unit 30 will now be described with reference to FIG. 8. In an embodiment, light redirected by the optical path changers 36 is used to form a stereoscopic image that is a plane image on a stereoscopic imaging plane P perpendicular to the emission surface 35a of the light guide plate 35. In an embodiment, light emitted from the LED 32a among the LEDs 32a, 32b, and 32c is used to form a stereoscopic image.

Figure 8:
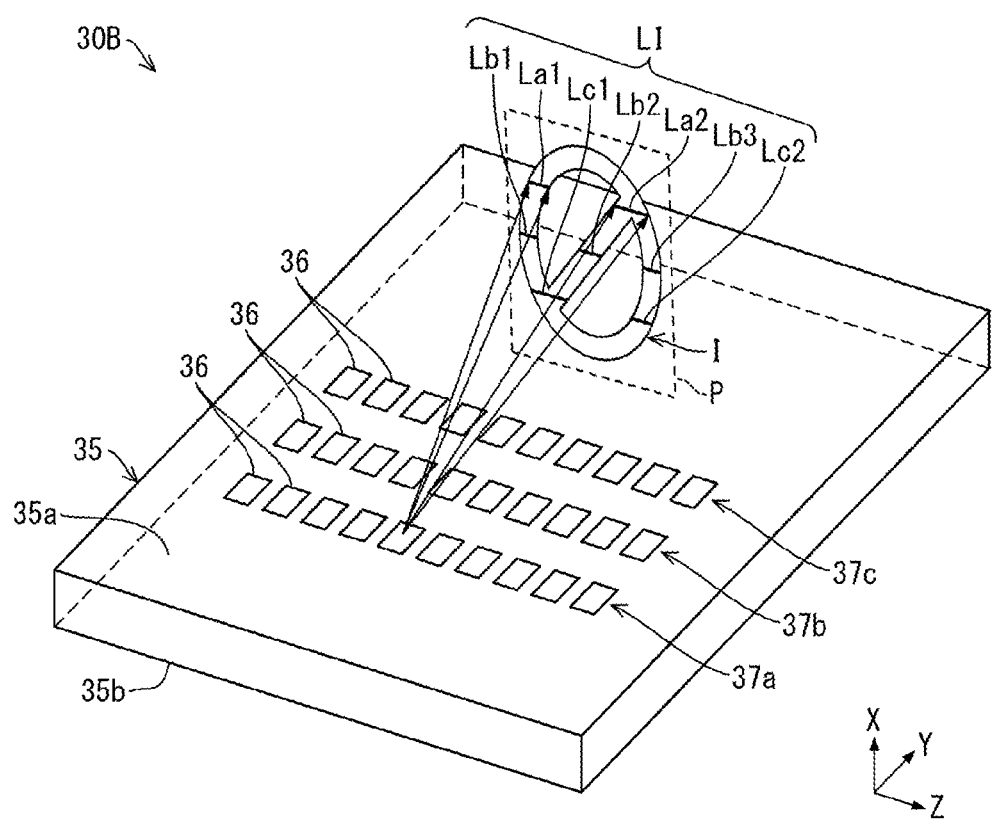
FIG. 8 is a perspective view illustrating an image projection unit describing the formation of a stereoscopic image.

FIG. 8 is a perspective view of the image projection unit 30 describing the formation of a stereoscopic image I. In an embodiment, the stereoscopic image I formed on the stereoscopic imaging plane P is a sign of a ring with a diagonal line inside.

In the image projection unit 30, for example, light redirected by each optical path changer 36 in the optical path changer set 37a intersects with the stereoscopic imaging plane P at a line La1 and a line La2 as shown in FIG. 8. The intersections with the stereoscopic imaging plane P form line images LI as part of the stereoscopic image I. The line images LI are parallel to the YZ plane. In this manner, light from the multiple optical path changers 36 included in the optical path changer set 37a forms the line images LI of the line La1 and the line La2. The light forming the images of line La1 and the line La2 may be provided by at least two of the optical path changers 36 in the optical path changer set 37a.

Similarly, light redirected by each optical path changer 36 in the optical path changer set 37b intersects with the stereoscopic imaging plane P at a line Lb1, a line Lb2, and a line Lb3. The intersections with the stereoscopic imaging plane P form line images LI as part of the stereoscopic image I.

Light redirected by each optical path changer 36 in the optical path changer set 37c intersects with the stereoscopic imaging plane P at a line Lc1 and a line Lc2. The intersections with the stereoscopic imaging plane P form line images LI as part of the stereoscopic image I.

The optical path changer sets 37a, 37b, 37c, and other sets form line images LI at different positions in X-direction. The optical path changer sets 37a, 37b, 37c, and other sets in the image projection unit 30 may be arranged at smaller intervals to form the line images LI at smaller intervals in X-direction. Thus, the image projection unit 30 combines the multiple line images LI formed by the light redirected by the optical path changers 36 in the optical path changer sets 37a, 37b, 37c, and other sets to form the stereoscopic image I that is a substantially plane image on the stereoscopic imaging plane P.

The stereoscopic imaging plane P may be or may not be perpendicular to the X-, Y-, or Z-axis. The stereoscopic imaging plane P may not be flat and may be curved. Thus, the image projection unit 30 may form a stereoscopic image I on any (flat or curved) plane in a space using the optical path changers 36. Multiple plane images may be combined to form a three-dimensional image.

In an embodiment, the stereoscopic image I is a ring mark with a diagonal line. In an embodiment, the optical path changers 36 in the optical path changer sets 37a, 37b, 37c, and other sets may be arranged differently to display any other stereoscopic images.

3. Operation Examples

Operation 1

The operation of the display device 1 will now be described. The display device 1 in the present operation example is installed on the vehicle 110. The display device 1 displays the image P13 or P12 in accordance with the alert level determined in accordance with the distance between the vehicle 110 and another vehicle. More specifically, the display device 1 is a blind spot detector (blind spot warning), which is an example of a surroundings monitoring device. The display device 1 generates an alert in accordance with the distance between the vehicle 110 and another vehicle traveling behind the vehicle 110.

In response to an alert at the first level, the display control unit 13 turns on the LEDs 22a and 22b without turning on the LED 32. The image display unit 20 displays the image P11 representing the vehicle 110 and the image P12 representing another vehicle as shown in FIG. 2A. The image projection unit 30 does not form the image P13 representing the other vehicle. In this case, the images P11 and P12 appear on the surface 211 of the light guide plate 21 as shown in FIG. 2B.

In response to an alert at the second level, the display control unit 13 turns on the LEDs 22a and 32 without turning on the LED 22b. As shown in FIG. 2C, the image display unit 20 then displays the image P11 representing the vehicle 110. The image projection unit 30 forms the image P13 representing the other vehicle in a manner superimposed on the image P12. In this case, the image P11 appears on the surface 211 of the light guide plate 21 and the image P13 appears nearer the user H than the display device 1 as shown in FIG. 2D. The distance between the image P13 and the user H thus differs from the distance between the image P12 and the user H.

The display control unit 13 may turn on the LED 22b in response to an alert at the second level. In this case, the images P12 and P13 appear at the same time.

Figure 9:
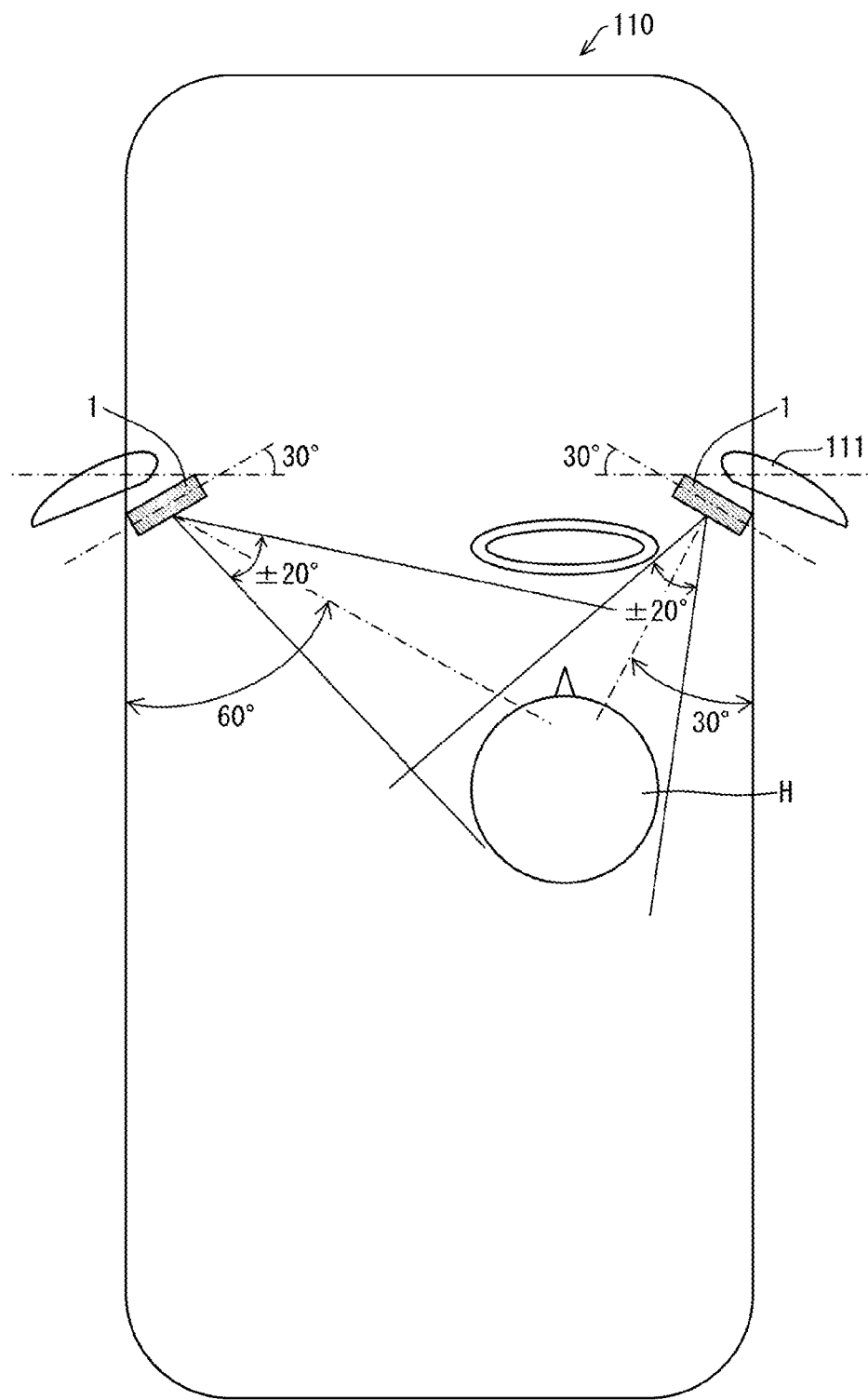
FIG. 9 is a diagram illustrating an example arrangement of a display device in operation 1.

FIG. 9 is a diagram showing an example arrangement of the display device 1. In the example shown in FIG. 9, the display device 1 is installed near a side mirror 111 in the vehicle 110, which is driven by the user H. The display device 1 is installed to have a surface on which images appear almost parallel to or specifically at angles of 30 degrees or less with the right-left direction of the vehicle 110.

In the example described above, the alert determination unit 12 determines an alert to be at one of two levels. In an embodiment, the alert determination unit 12 may use three levels of an alert. In this case, the display device 1 further includes another display unit for displaying an alert at an alert level determined by the alert determination unit 12.

For example, the alert determination unit 12 may use ten levels of an alert. In this case, the image display unit 20 and the image projection unit 30 each include five light guide plates and LEDs for emitting light into these light guide plates. The display device 1 with this structure uses the image display unit 20 to display images in response to alerts at five levels and uses the image projection unit 30 to form images in response to alerts at the other five levels. A single light guide plate may display multiple levels of alerts by, for example, displaying images at different positions or with different colors. This structure reduces the number of light guide plates. The image display unit 20 and the image projection unit 30 may include different numbers of light guide plates.

As described above, the display device 1 displays the images P12 and P13 at different distances from the user H to emphasize the second level alert to the user H. In other words, the display device 1 uses different distances between images and the user H to allow the user H to distinguish different alert levels. The display device 1 can alert the user in a manner more emphasized than a device that alerts the user by, for example, changing the area of each image.

Operation 2

The operation of a display device 2 different from the display device 1 will now be described. Similar to the display device 1, the display device 2 is a blind spot detector (blind spot warning) that generates an alert in accordance with the distance between the vehicle 110 and an object, such as another vehicle traveling behind the vehicle 110.

Figure 11A:
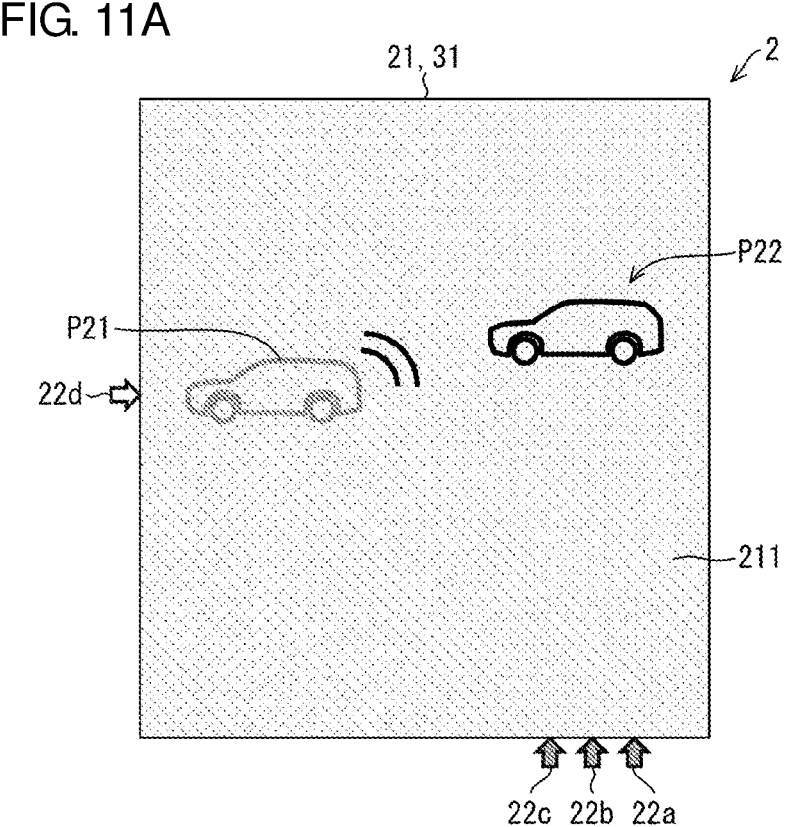
FIG. 11A is a front view illustrating a display device showing a display example in operation 2 at a second alert level.
Figure 11B:
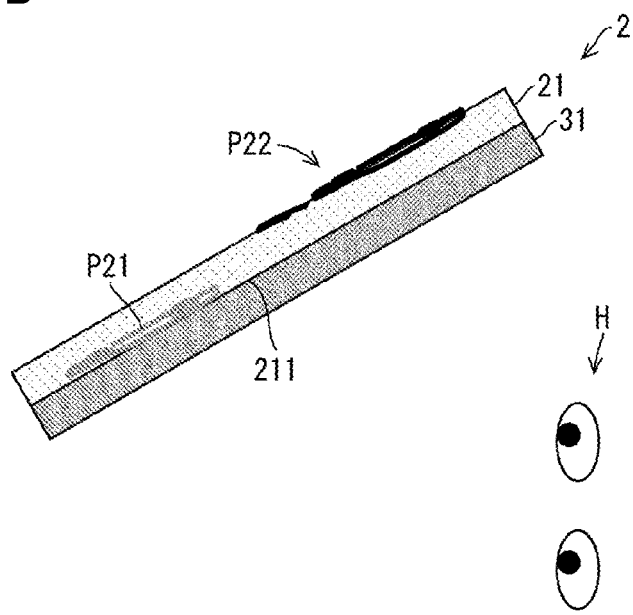
FIG. 11B is a side view illustrating a display device showing a display example in operation 2 at a second alert level.

FIG. 10A is a front view of the display device 2 showing a display example at a first alert level. FIG. 10B is a side view of the display device 2 showing the display example at the first alert level. FIG. 11A is a front view of the display device 2 showing a display example at a second alert level. FIG. 11B is a side view of the display device 2 showing the display example at the second alert level. For simplicity, the LEDs 22*a* to 22*c* are not shown in FIG. 10A, and the LEDs 32*a* to 32*c* are not shown in FIG. 11A.

The structure of the display device 2 will be described first, and its operation will be described. As shown in FIGS. 10A and 10B, and FIGS. 11A and 11B, an image display unit 20 in the display device 2 includes a light guide plate 21 and four LEDs 22*a* to 22*d* (second light source). When at least one of the LEDs 22*a* to 22*d* is turned on, the image display unit 20 displays an image P22 (second alert image) associated with the illuminating LED on a surface 211 of the light guide plate 21. More specifically, when one of the LEDs 22*a* to 22*c* is turned on, the image display unit 20 displays the image P22 representing the other vehicle approaching the vehicle 110 at a position corresponding to the illuminating LED. The LED 22*d* is associated with an image P21 representing the vehicle 110.

An image projection unit 30 includes a light guide plate 31 and three LEDs 32*a* to 32*c*. When at least one of the LEDs 32*a* to 32*c* is turned on, the image projection unit 30 forms images P23*a* to P23*c* (first alert images) at positions corresponding to the illuminating LEDs, which are farther from the user than the image projection unit 30.

In response to an alert at a first level, a display control unit 13 turns on the LEDs 22*d* and 32*a* to 32*c*. The display control unit 13 controls the LED 22*d* to be constantly on. In contrast, the display control unit 13 repeatedly turns on and off the LEDs 32*a* to 32*c* in this order. The display device 2 thus displays, in a switching manner, the image P23*a* (indicated by a solid line in FIG. 10A), the image P23*b* (indicated by a broken line in FIG. 10A), and the image P23*c* (indicated by a dotted line in FIG. 10A) at different positions, which are farther from the user than the image projection unit 30. The appearing images thus represent the other vehicle behind approaching the vehicle 110.

In response to an alert at a second level, the display control unit 13 turns on the LEDs 22*a* to 22*d*. Similar to the LEDs 32*a* to 32*c*, the display control unit 13 repeatedly turns on and off the LEDs 22*a* to 22*c* in this order. In this manner, the display device 2 displays the image P22 as an animation of three frames on the surface of the image display unit 20 in response to the alert at the second level.

The number of LEDs for displaying the images P22 and P23 may not be three. When n LEDs are used (n is an integer of two or greater), the images P22 and P23 can appear as an animation of n frames.

Figure 12:
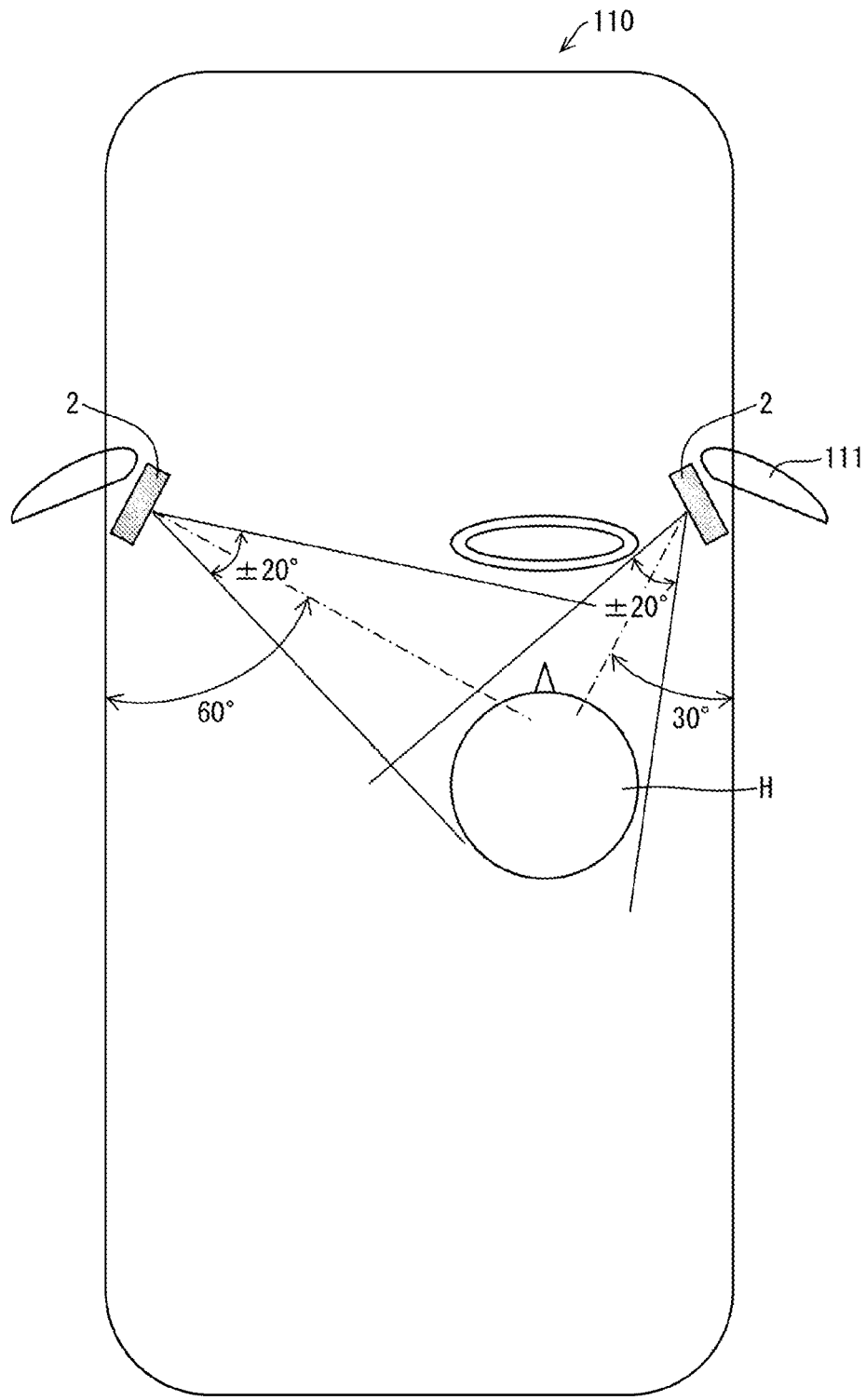
FIG. 12 is a diagram illustrating an example arrangement of a display device in operation 2.

FIG. 12 is a diagram showing an example arrangement of the display device 2. Similar to the display device 1, the display device 2 is installed near a side mirror 111 in the vehicle 110, which is driven by the user H, in the example shown in FIG. 12. Unlike the display device 1, the display device 2 is installed to have a surface on which images appear at angles nearer right angles to the right-left direction of the vehicle 110, or specifically at angles of 60 degrees or more.

Operation 3

The operation of a display device 3 different from the display devices 1 and 2 will now be described. The display device 3 is a rear behind vehicle detector (rear cross alert), which is an example of a surroundings monitoring device, for generating an alert when a vehicle passing behind the vehicle 110 is detected.

Figure 13A:
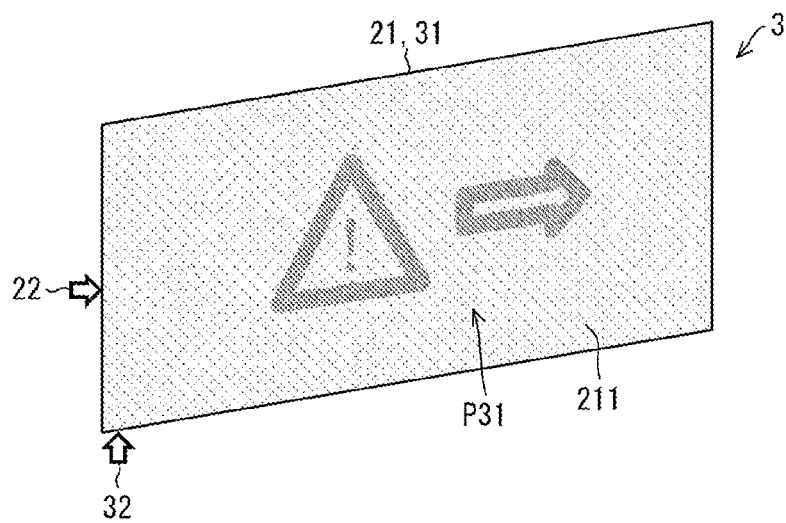
FIG. 13A is a perspective view illustrating a display device showing a display example in operation 3 at a first alert level.
Figure 13B:
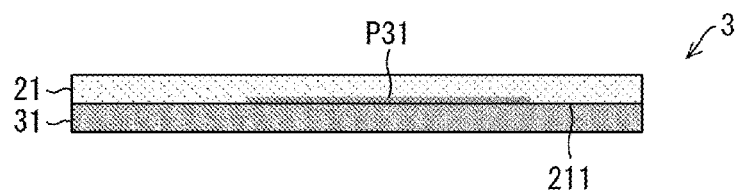
FIG. 13B is a top view illustrating a display device showing a display example in operation 3 at a first alert level.
Figure 13B:
Figure 14A:
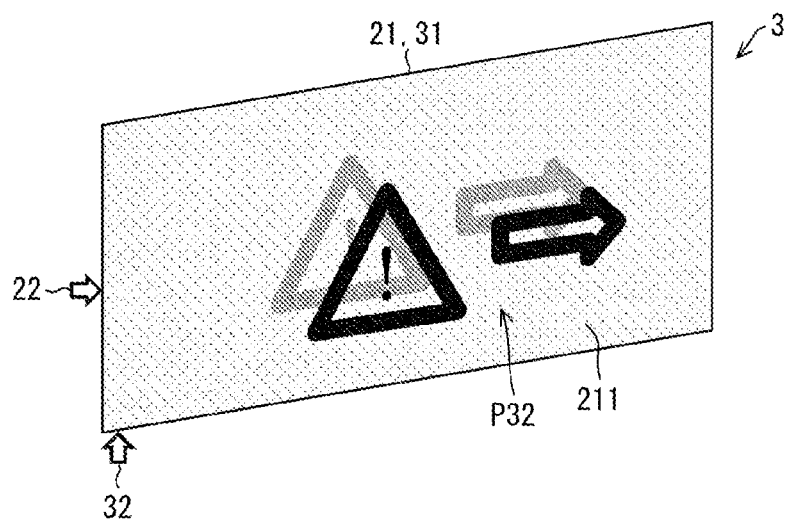
FIG. 14A is a perspective view illustrating a display device showing a display example in operation 3 at a second alert level.
Figure 14B:
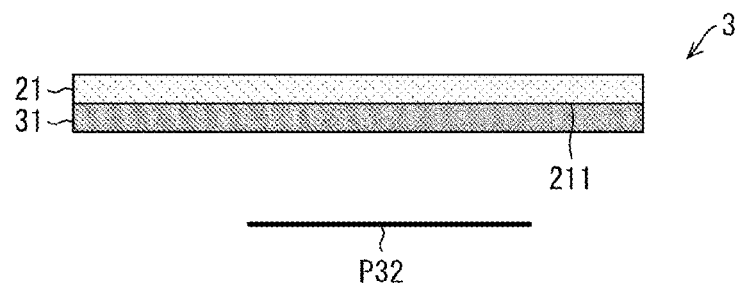
FIG. 14B is a top view illustrating a display device showing a display example in operation 3 at a second alert level.
Figure 14B:

FIG. 13A is a perspective view of the display device 3 showing a display example at a first alert level. FIG. 13B is a top view of the display device 3 showing the display example at the first alert level. FIG. 14A is a perspective view of the display device 3 showing a display example at a second alert level. FIG. 14B is a top view of the display device 3 showing the display example at the second alert level.

The structure of the display device 3 will be described first, and its operation will be described. As shown in FIGS. 13A and 13B, and FIGS. 14A and 14B, an image display unit 20 in the display device 3 includes a light guide plate 21 and an LED 22 (second light source). An image projection unit 30 includes a light guide plate 31 and an LED 32 (first light source). The image display unit 20 and the image projection unit 30 display an alert when detecting a vehicle passing behind the vehicle 110.

In response to an alert at a first level, the display control unit 13 turns on only the LED 22. An image P31 (second alert image) representing an alert appears on the surface 211 of the light guide plate 21 as shown in FIGS. 13A and 13B.

In response to an alert at a second level, the display control unit 13 turns off the LED 22 and turns on the LED 32. In this case, as shown in FIGS. 14A and 14B, the image projection unit 30 forms an image P32 (first alert image) representing an alert at a position nearer the user than the surface of the image projection unit 30. The display control unit 13 may turn on both the LEDs 22 and 32 in response to the alert at the second level.

In FIGS. 13A and 13B, and FIGS. 14A and 14B, the images P31 and P32 each include a single arrow indicating one direction. In an embodiment, the images P31 and P32 may each display one or more arrows indicating different directions in which another vehicle behind the vehicle 110 is approaching. In this case, the image projection unit 30 may include LEDs corresponding to such arrows.

Figure 15:
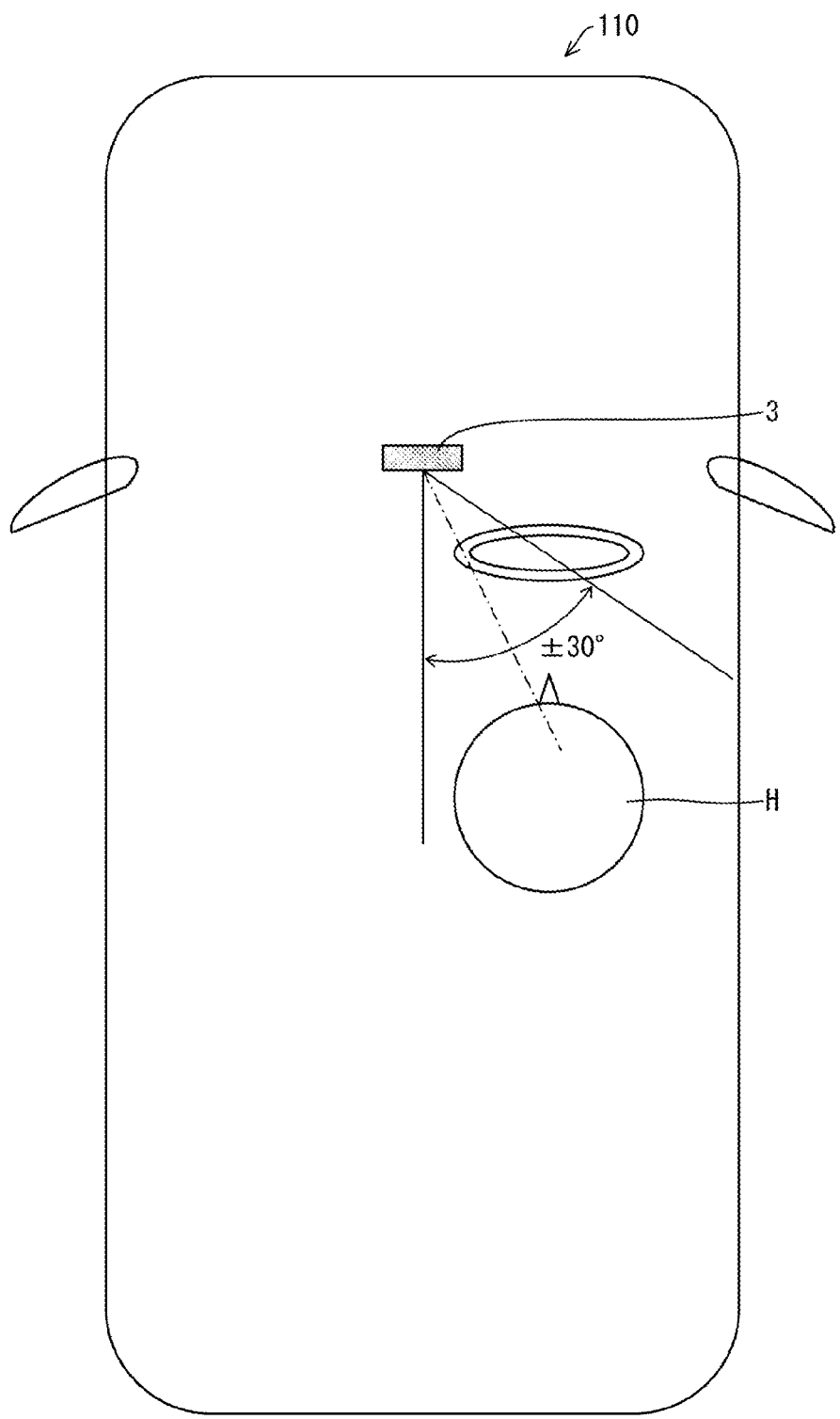
FIG. 15 is a diagram illustrating an example arrangement of a display device in operation 3.

FIG. 15 is a diagram showing an example arrangement of the display device 3. As shown in FIG. 15, the display device 3 may be installed near a rear-view mirror (not shown) in the vehicle 110.

Operation 4

The operation of a display device 4 different from the display devices 1 to 3 will now be described. The display device 4, which is a surroundings monitoring device, generates an alert in accordance with the distance between the vehicle 110 and another object in four directions.

Figure 16A:
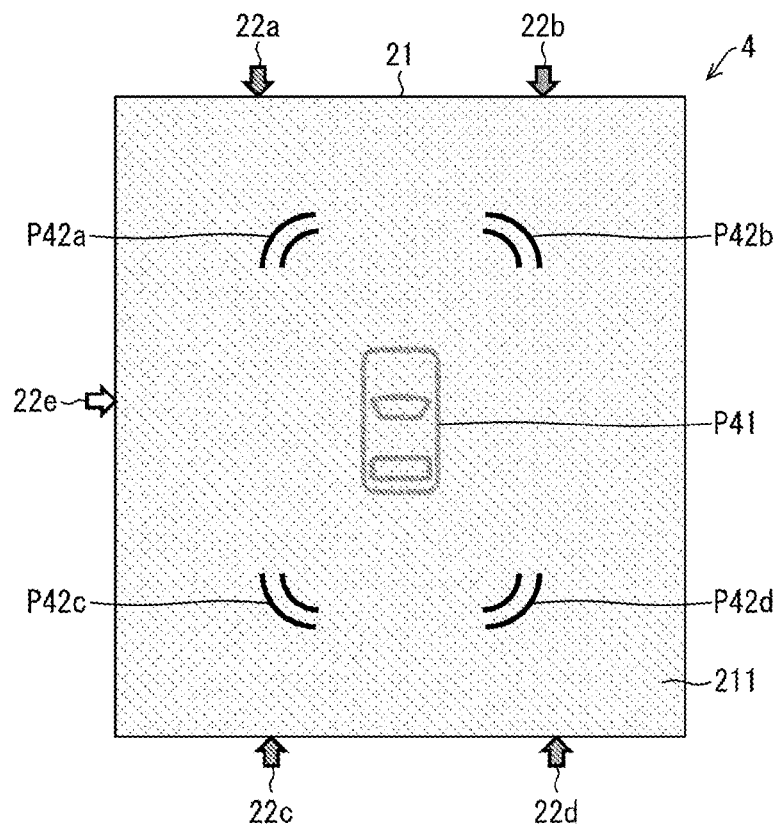
FIG. 16A is a front view illustrating a display device showing a display example in operation 4 at a first alert level.
Figure 16B:
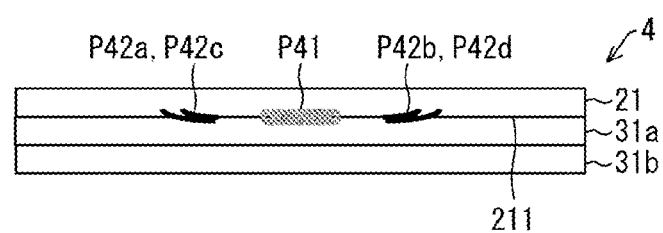
FIG. 16B is a top view illustrating a display device showing a display example in operation 4 at a first alert level.
Figure 16B:
Figure 17A:
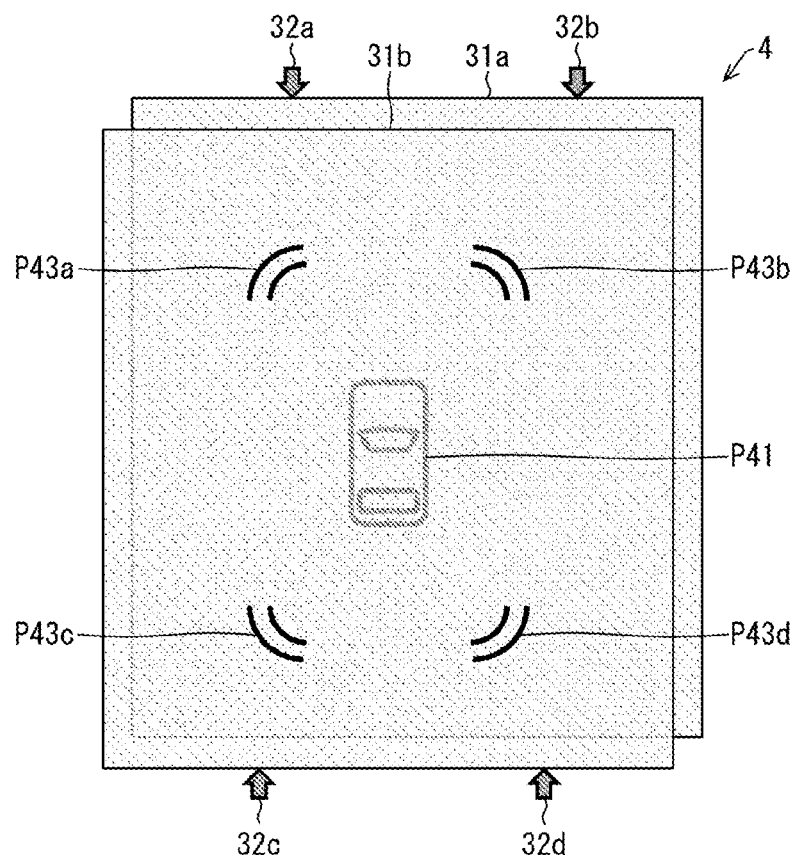
FIG. 17A is a front view illustrating a display device showing a display example in operation 4 at a second alert level.
Figure 17B:
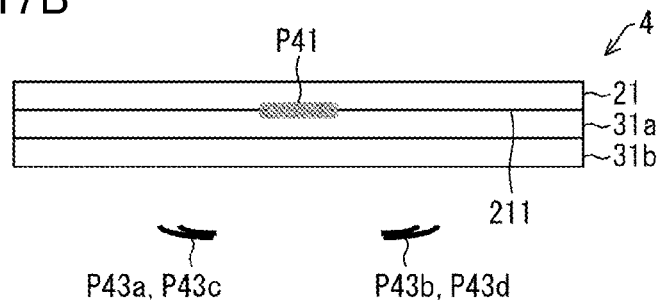
FIG. 17B is a top view illustrating a display device showing a display example in operation 4 at a second alert level.
Figure 17B:

FIG. 16A is a front view of a display device 4 showing a display example at a first alert level. FIG. 16B is a top view of the display device 4 showing the display example at the first alert level. FIG. 17A is a front view of the display device 4 showing a display example at a second alert level. FIG. 17B is a top view of the display device 4 showing a display example at the second alert level. For simplicity, the light guide plates 31*a* and 31*b* are not shown in FIG. 16A, and the light guide plate 21 is not shown in FIG. 17A. Although the light guide plates 31*a* and 31*b* overlap each other with margins in FIG. 17A, they may overlap each other with no margins.

The structure of the display device 4 will be described first, and its operation will be described. As shown in FIGS. 16A and 16B, and FIGS. 17A and 17B, an image display unit 20 in the display device 4 includes a light guide plate 21 and five LEDs 22*a* to 22*e*. The LEDs 22*a* to 22*d* are respectively associated with the images P42*a* to P42*d*, which indicate alerts for the left front, the right front, the left rear, and the right rear of the vehicle 110 in this order. The LED 22*e* is associated with an image P41 representing the vehicle 110.

The image projection unit 30 includes two light guide plates 31a and 31b (first light guide plate) and four LEDs 32a to 32d (first light source). The LEDs 32a to 32d are respectively associated with the images P43a to P43d, which indicate alerts for the left front, the right front, the left rear, and the right rear of the vehicle 110 in this order. The light guide plate 31a displays the images P43a and P43b representing the left and right fronts of the vehicle 110, whereas the light guide plate 31b displays the images P43c and P43d representing the left and right rears of the vehicle 110. The LEDs 32a and 32b emit light into the light guide plate 31a. The LEDs 32c and 32d emit light into the light guide plate 31b.

When generating an alert, the display device 4 also notifies the user of the direction in which another object is approaching. More specifically, the display device 4 determines the level of an alert for each of the four directions, which are the right front, the left front, the right rear, and the left rear of the vehicle 110, in accordance with the distance between the vehicle 110 and an object such as another vehicle, and generates an alert.

In response to an alert at a first level, the display control unit 13 turns on one or more of the LEDs 22a to 22d corresponding to the direction in which an alert is generated, as well as the LED 22e. When all the LEDs 22a to 22e are turned on, the images P41 and 42a to 42d appear as shown in FIGS. 16A and 16B. In actual use of the display device 4, the image display unit 20 displays one or more of the images P42a to P42d corresponding to the direction in which an alert is generated, as well as the image P41.

In response to an alert at a second level, the display control unit 13 turns on one or more of the LEDs 32a to 32d corresponding to the direction in which an alert is generated. When all the LEDs 32a to 32d are turned on, the images P43a to P43d appear in a space as shown in FIGS. 17A and 17B. In actual use of the display device 4, the image projection unit 30 forms one or more of the images P43a to P43d corresponding to the direction in which an alert is generated. The display control unit 13 turns on the LED 22e to cause the image display unit 20 to display the image P41 representing the vehicle 110.

The display device 4 may not notify the user H of an alert for all the four directions described above. For example, the display device 4 may be a rear monitor for generating an alert only for the right behind and the left behind of the vehicle, to which the user H may often fail to pay attention. This structure eliminates the light guide plate 31a.

Figure 18:
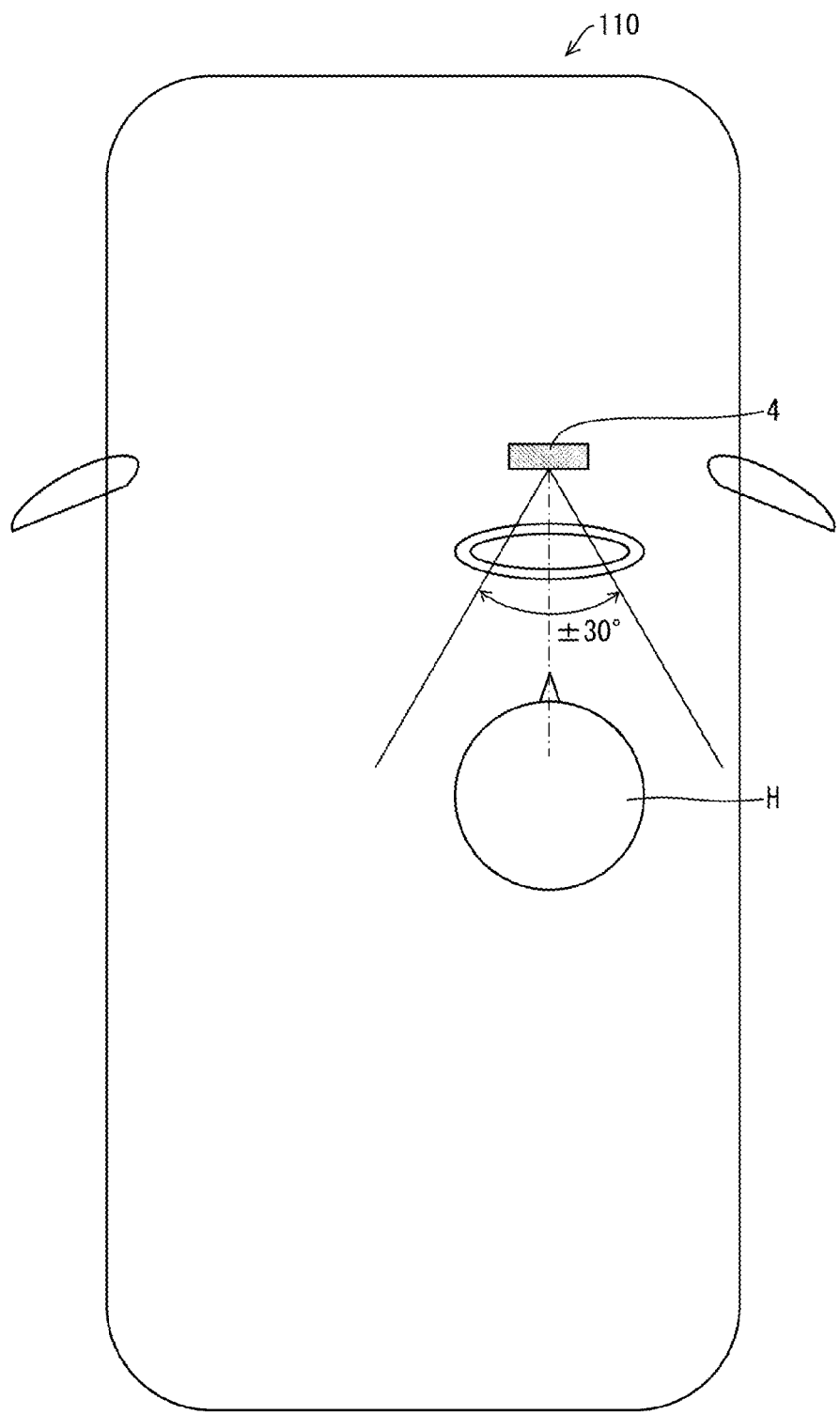
FIG. 18 is a diagram illustrating an example arrangement of a display device in operation 4.

FIG. 18 is a diagram showing an example arrangement of the display device 4. As shown in FIG. 18, the display device 4 is installed, for example, in front of the driver's seat in the vehicle 110. The display device 4 may be installed on a navigation system or on a rear-view mirror included in the vehicle 110.

Modification of Operation 4

Figure 19A:
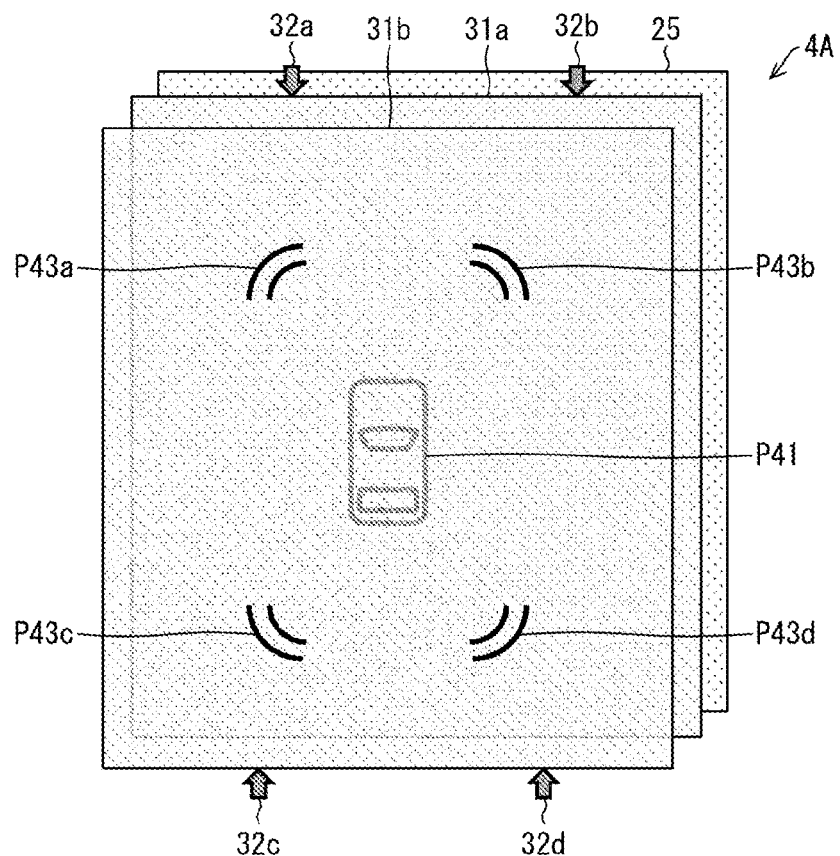
FIG. 19A is a perspective view illustrating a modification of a display device in operation 4.
Figure 19B:
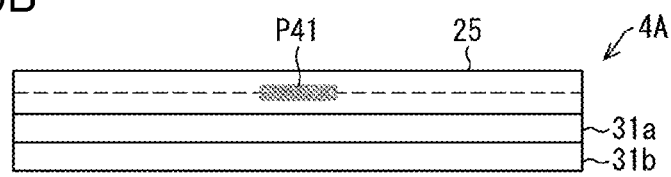
FIG. 19B is a top view illustrating a modification of a display device in operation 4.
Figure 19B:
Figure 19B:

FIG. 19A is a perspective view of a display device 4A according to a modification of the display device 4. FIG. 19B is a top view of the display device 4A. The display device 4A includes an auxiliary display unit 25 (second image display unit) in addition to the components included in the display device 4. The display device 4A eliminates the light guide plate 21 and the LEDs 22a to 22e.

The auxiliary display unit 25 is an image display device for displaying images on a screen. The auxiliary display unit 25 may be, for example, a liquid crystal display. In the display device 4A, the auxiliary display unit 25 displays images P41 and P42a to P42d. The light guide plates 31a and 31b, which overlap the auxiliary display unit 25, display or form images P43a to P43d representing an alert in accordance with the on or off state of the LEDs 32a to 32d.

Operation 5

The operation of a display device 5 different from the display devices 1 to 4 will now be described.

Figure 20A:
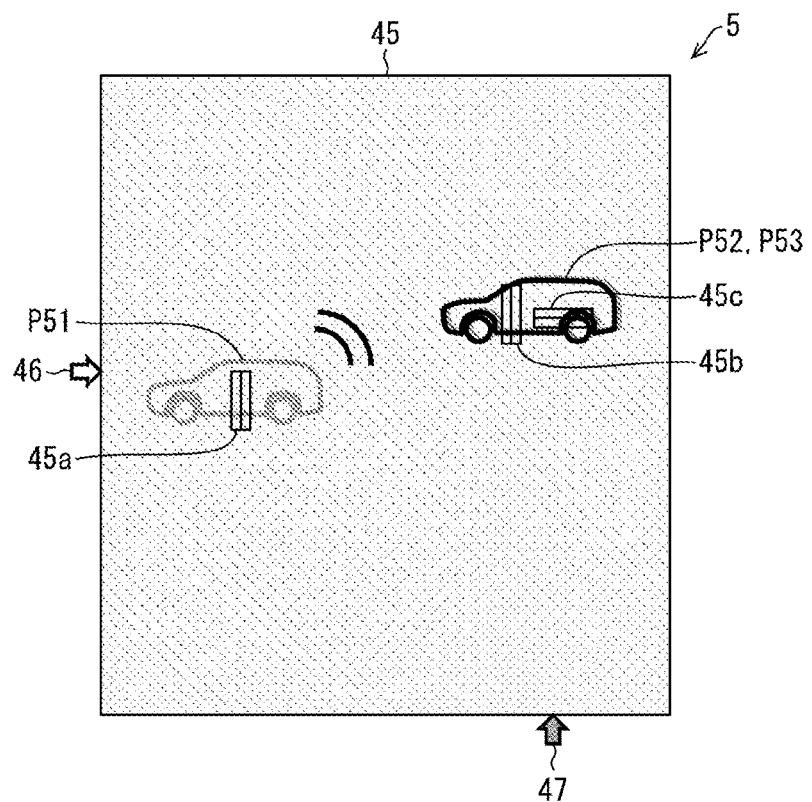
FIG. 20A is a diagram illustrating the structure of a display device in operation 5.

FIG. 20A is a diagram showing the structure of the display device 5. As shown in FIG. 20A, the display device 5 includes a light guide plate 45 and LEDs 46 and 47. In the display device 5, the image display unit 20 includes the light guide plate 45 and the LED 46. The image projection unit 30 includes the light guide plate 45 and the LED 47. More specifically, the display device 5 includes the light guide plate 45 commonly used for the image display unit 20 and the image projection unit 30.

The LED 46 is arranged on the side of the light guide plate 45 parallel to the vertical direction. The LED 47 is arranged on the side of the light guide plate 45 parallel to a horizontal plane. Light emitted from the LED 46 travels in the horizontal direction, whereas light emitted from the LED 47 travels in the vertical direction.

The light guide plate 45 contains optical path changers 45a, 45b, and 45c. The optical path changers 45a and 45b each converge light traveling in the horizontal direction at a predetermined position to form an image. The optical path changer 45c converges light traveling in the vertical direction at a predetermined position to form an image. The optical path changers 45a and 45b converge the light emitted from the LED 46 to display an image P51, which represents the vehicle 110, and an image P52, which represents another vehicle, on the surface of the light guide plate 45. The optical path changer 45c converges the light emitted from the LED 47 to form an image P53, which indicates the other vehicle.

Figure 20B:
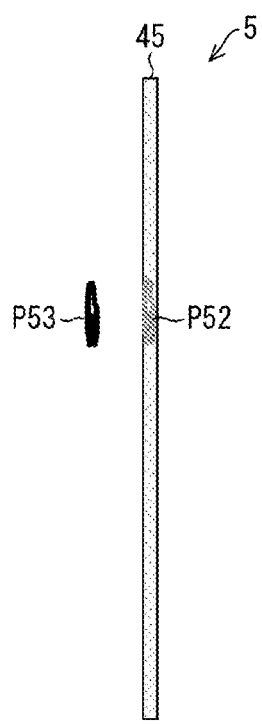
FIG. 20B is a diagram illustrating the positions of images relative to a light guide plate.

FIG. 20B is a diagram showing the positions of the images P52 and P53 relative to the light guide plate 45. As shown in FIG. 20B, the image P52 appears on the surface of the light guide plate 45. The image P53 appears at a position apart from the light guide plate 45. When the image P53 appears nearer the user than the light guide plate 45, the image P52 may appear in response to an alert at a first level, and the image P53 may appear in response to an alert at a second level. When the image P53 appears at a position farther from the user than the light guide plate 45, the image P53 may appear in response to an alert at a first level, and the image P52 may appear in response to an alert at a second level.

The light guide plate 45 contains the optical path changers 45b and 45c that form the images P52 and P53 in a manner superimposed on each other. The optical path changers 45b and 45c arranged in this manner overlap each other in an embodiment.

4. Modifications

The embodiments described in detail above are mere examples of the present invention in all respects. The embodiments may be variously modified or altered without departing from the scope of the invention. For example, the embodiments may be modified in the following forms. Hereafter, the components that are the same as those in the above embodiments are given the same numerals, and the operations that are the same as those in the above embodiments will not be described. The modifications described below may be combined as appropriate.

4.1

The image projection unit 30 included in the device according to the present disclosure may have the structure other than the structure described in a first embodiment. In the present modification, a stereoscopic image display unit 50, which is a modification of the image projection unit 30 according to a first embodiment, will be described.

Figure 21:
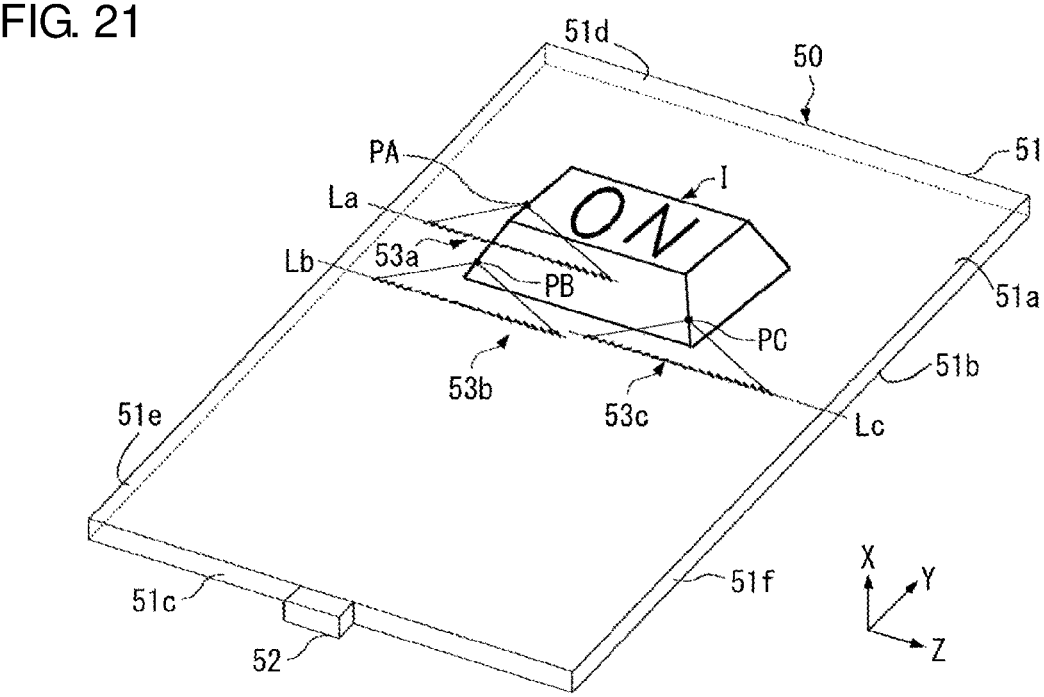
FIG. 21 is a perspective view illustrating a stereoscopic image display unit according to a modification.

FIG. 21 is a perspective view of the stereoscopic image display unit 50. In FIG. 21, the stereoscopic image display unit 50 displays a stereoscopic image I, and specifically a stereoscopic image I of a button (protruding in the positive X-direction) showing the word ON. As shown in FIG. 21, the stereoscopic image display unit 50 includes a light guide plate 51 and a light source 52.

The light guide plate 51 is rectangular and formed from a transparent resin material with a relatively high refractive index. The material for the light guide plate 51 may be a polycarbonate resin, a polymethyl methacrylate resin, or glass. The light guide plate 51 has an emission surface 51a for emitting light, a back surface 51b opposite to the emission surface 51a, and the four end faces 51c, 51d, 51e, and 51f. The end face 51c is an incident surface that allows light emitted from the light source 52 to enter the light guide plate 51. The end face 51d is opposite to the end face 51c. The end face 51e is opposite to the end face 51f. The light guide plate 51 guides the light from the light source 52 to diverge within a plane parallel to the emission surface 51a. The light source 52 is, for example, an LED.

The light guide plate 51 has multiple optical path changers 53 on the back surface 51b, including an optical path changer 53a, an optical path changer 53b, and an optical path changer 53c. The optical path changers 53 are arranged substantially continuously and extend in Z-direction. In other words, the multiple optical path changers 53 are arranged along predetermined lines within a plane parallel to the emission surface 51a. More specifically, as shown in FIG. 21, the optical path changer 53a is arranged along a line La, the optical path changer 53b is arranged along a line Lb, and the optical path changer 53c is arranged along a line Lc. The lines La, Lb, and Lc are substantially parallel to Z-direction. Any optical path changers 53 may be formed substantially continuously along straight lines parallel to Z-direction.

Each optical path changer 53 receives, across its length in Z-direction, the light emitted from the light source 52 and guided by the light guide plate 51. Each optical path changer 53 substantially converges the light incident at positions across the length of each optical path changer 53 to a fixed point corresponding to each optical path changer 53. FIG. 21 shows the optical path changer 53a, the optical path changer 53b, and the optical path changer 53c selectively from the optical path changers 53, showing the convergence of multiple rays of light reflected by the optical path changer 53a, the optical path changer 53b, and the optical path changer 53c.

More specifically, the optical path changer 53a corresponds to a fixed point PA on the stereoscopic image I. Light received at positions across the length of the optical path changer 53a converges at the fixed point PA. Thus, the wave surface of light from the optical path changer 53a appears to be the wave surface of light emitted from the fixed point PA. The optical path changer 53b corresponds to a fixed point PB on the stereoscopic image I. Light received at positions across the length of the optical path changer 53b converges at the fixed point PB. In this manner, light received at positions across the length of an optical path changer 53 substantially converges at a fixed point corresponding to the optical path changer 53. Any optical path changer 53 thus provides the wave surface of light that appears to be emitted from the corresponding fixed point. Different optical path changers 53 correspond to different fixed points. The set of multiple fixed points corresponding to the optical path changers 53 forms a user-recognizable stereoscopic image I in a space (more specifically, in a space above the emission surface 51a of the light guide plate 51).

A device according to a modification of the present disclosure may include the stereoscopic image display unit 50 described in the present modification in place of the image projection unit 30 according to a first embodiment.

4.2

In this modification, a stereoscopic image display unit 80, which is another modification of the image projection unit 30 according to a first embodiment, will be described.

Figure 22:
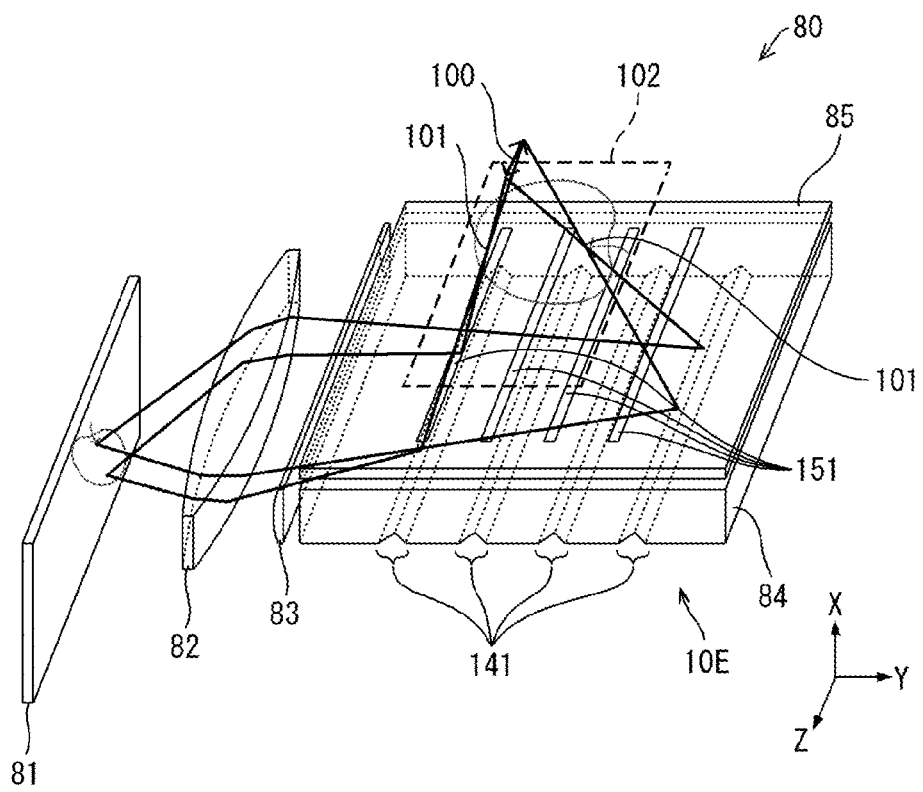
FIG. 22 is a perspective view illustrating a stereoscopic image display unit according to a modification.
Figure 23:
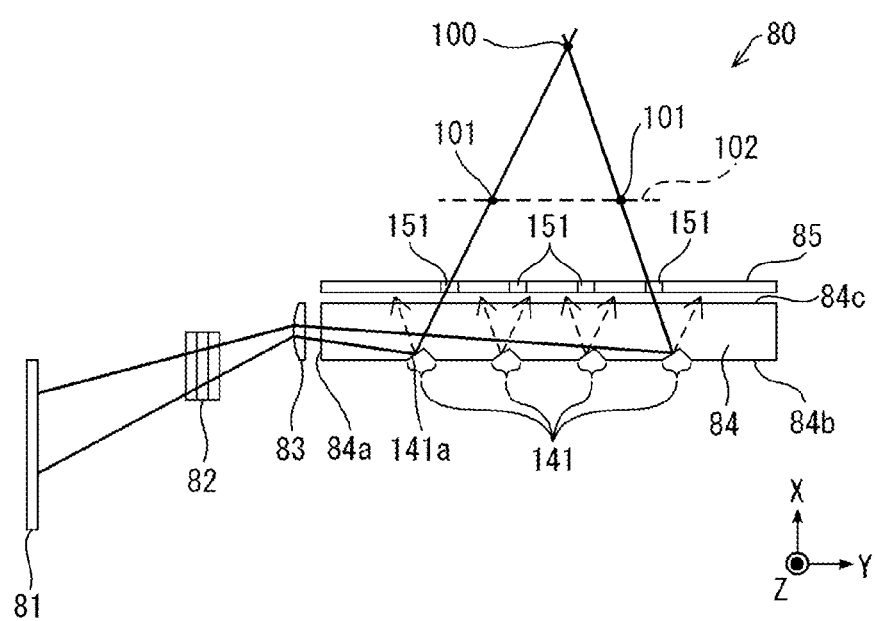
FIG. 23 is a cross-sectional view illustrating a stereoscopic image display unit according to a modification.

FIG. 22 is a perspective view of the stereoscopic image display unit 80. FIG. 23 is a cross-sectional view of the stereoscopic image display unit 80.

As shown in FIGS. 22 and 23, the stereoscopic image display unit 80 includes an image display 81, an imaging lens 82, a collimator lens 83, a light guide plate 84, and a mask 85. The image display 81, the imaging lens 82, the collimator lens 83, and the light guide plate 84 are arranged in this order along Y-axis. The light guide plate 84 and the mask 85 are arranged in this order along X-axis.

The image display 81 displays, in its display area, a two-dimensional image that is projected in the air by the stereoscopic image display unit 80 in response to an image signal from a controller (not shown). The image display 81 may be a common liquid crystal display that can output image light by displaying an image in the display area. In the illustrated example, the light guide plate 84 has an incident surface 84a facing the display area of the image display 81. The display area and the incident surface 84a are arranged parallel to the XZ plane. The light guide plate 84 has a back surface 84b on which prisms 141 (described later) are arranged and an emission surface 84c (light emission surface) for emitting light to the mask 85. The back surface 84b and the emission surface 84c are opposite to each other and parallel to the YZ plane. The mask 85 has a surface with slits 151 (described later), which is also parallel to the YZ plane. The display area of the image display 81 and the incident surface 84a of the light guide plate 84 may face each other, or the display area of the image display 81 may be inclined to the incident surface 84a.

The imaging lens 82 is located between the image display 81 and the incident surface 84a. The imaging lens 82 converges the image light output in the display area of the image display 81 in the YZ plane parallel to the length of the incident surface 84a, and emits the converged light to the collimator lens 83. The imaging lens 82 may be any lens that can converge the image light. For example, the imaging lens 82 may be a bulk lens, a Fresnel lens, or a diffraction lens. The imaging lens 82 may also be a combination of lenses arranged along Z-axis.

The collimator lens 83 is located between the image display 81 and the incident surface 84a. The collimator lens 83 collimates the image light converged by the imaging lens 82 in the XY plane orthogonal to the length of the incident surface 84a. The collimator lens 83 emits the collimated image light to the incident surface 84a of the light guide plate 84. The collimator lens 83 may also be a bulk lens or a Fresnel lens like the imaging lens 82. The imaging lens 82 and the collimator lens 83 may be arranged in the reverse order. The functions of the imaging lens 82 and the collimator lens 83 may be implemented by one lens or a combination of multiple lenses. More specifically, the imaging lens 82 and the collimator lens 83 may be any combination that can converge, in the YZ plane, the image light output by the image display 81 from the display area and collimate the image light in the XY plane.

The light guide plate 84 is a transparent member, and its incident surface 84a receives the image light collimated in the collimator lens 83, and its emission surface 84c emits the light. In the illustrated example, the light guide plate 84 is a plate-like rectangular prism, and the incident surface 84a is a surface facing the collimator lens 83 and parallel to the XZ plane. The back surface 84b is a surface parallel to the YZ plane and located in the negative X-direction, whereas the emission surface 84c is a surface parallel to the YZ plane and opposite to the back surface 84b. The light guide plate 84 includes the multiple prisms (optical path changers) 141.

The multiple prisms 141 reflect the image light incident through the incident surface 84a of the light guide plate 84. The prisms 141 are arranged on the back surface 84b of the light guide plate 84 and protrude from the back surface 84b toward the emission surface 84c. For the image light traveling in Y-direction, the prisms 141 are, for example, substantially triangular grooves arranged at predetermined intervals (e.g., 1 mm) in Y-direction and having a predetermined width (e.g., 10 µm) in Y-direction. Each prism 141 has optical faces, with its face nearer the incident surface 84a in the image light guided direction (positive Y-direction) being a reflective surface 141a. In the illustrated example, the prisms 141 are formed in the back surface 84b parallel to Z-axis. The image light incident through the incident surface 84a and traveling in Y-direction is reflected by the reflective surfaces 141a of the multiple prisms 141 formed parallel to Z-axis orthogonal to Y-axis. The display area of the image display 81 emits image light from positions different in X-direction orthogonal to the length of the incident surface 84a, and each of the prisms 141 causes the image light to travel toward a predetermined viewpoint 100 from the emission surface 84c of the light guide plate 84. The reflective surface 141a will be described in detail later.

The mask 85 is formed from a material opaque to visible light, and has multiple slits 151. The mask 85 allows, selectively from the light emitted through the emission surface 84c of the light guide plate 84, passage of light traveling toward imaging points 101 in a plane 102 through the slits 151.

The multiple slits 151 allow, selectively from the light emitted through the emission surface 84c of the light guide plate 84, passage of the light traveling toward the imaging points 101 in the plane 102 through the slits 151. In the illustrated example, the slits 151 extend parallel to Z-axis. Each slit 151 corresponds to one of the prisms 141.

The stereoscopic image display unit 80 with this structure allows an image appearing on the image display 81 to be formed and projected on the virtual plane 102 external to the stereoscopic image display unit 80. More specifically, the image light is first emitted from the display area of the image display 81, and passes through the imaging lens 82 and the collimator lens 83. The image light then enters the incident surface 84a, which is an end face of the light guide plate 84. The image light incident on the light guide plate 84 travels through the light guide plate 84 and reaches the prisms 141 on the back surface 84b of the light guide plate 84. The image light reaching the prisms 141 is then reflected by the reflective surfaces 141a of the prisms 141. The reflected image light travels in the positive X-direction, and is emitted through the emission surface 84c of the light guide plate 84 parallel to the YZ plane. The image light emitted through the emission surface 84c partially passes through the slits 151 in the mask 85 to form an image at the imaging points 101 on the plane 102. In other words, the image light emitted from individual points in the display area of the image display 81 converges in the YZ plane and is collimated in the XY plane. The resulting image light is projected on the imaging points 101 on the plane 102. The stereoscopic image display unit 80 can perform this processing for all points in the display area to project the image output in the display area of the image display 81 onto the plane 102. As a result, the user can visually identify the image projected in the air when viewing the virtual plane 102 from the viewpoint 100. Although the plane 102 is a virtual plane on which a projected image is formed, a screen may be used to serve as the plane 102 to improve visibility.

In the stereoscopic image display unit 80 according to an embodiment, image light passes through the slits 151 in the mask 85 selectively from the image light emitted through the emission surface 84c to form an image. However, any structure with no mask 85 or no slit 151 may allow image light to form on the imaging points 101 on the virtual plane 102.

For example, the reflective surface of each prism 141 and the back surface 84b may form a larger angle at a larger distance from the incident surface 84a. This structure can allow image light to form on the imaging points 101 on the virtual plane 102. The angle may be set to allow the prism 141 farthest from the incident surface 84a to totally reflect light from the image display 81.

With the above angle setting, light emitted at a position more rearward from the back surface 84b in X-direction in the display area of the image display 81 (in the negative X-direction) toward a predetermined viewpoint is reflected by a prism 141 farther from the incident surface 84a. However, the stereoscopic image display unit may have any other structure that has the correspondence between one position in X-direction in the display area of the image display 81 and one prism 141. Light reflected by a prism 141 farther from the incident surface 84a travels in a direction more inclined toward the incident surface 84a, whereas light reflected by a prism 141 nearer the incident surface 84a travels in a direction more inclined away from the incident surface 84a. Thus, the light from the image display 81 can be emitted toward a particular viewpoint without the mask 85. In Z-direction, the light emitted through the light guide plate 84 is focused on the image projected plane and diffuses as the light travels away from the plane. This causes a parallax in Z-direction, which enables a viewer to view a projected image stereoscopically with both eyes aligned in Z-direction.

This structure does not block light reflected by each prism 141 and traveling to the viewpoint. The viewer can thus view the image appearing on the image display 81 and projected in the air also when moving his or her viewpoint along Y-axis. However, the angle formed by the light beam directed from each prism 141 to the viewpoint and the reflective surface of the prism 141 changes in accordance with the viewpoint position in Y-direction, and the position of the point on the image display 81 corresponding to the light beam also changes accordingly. In this example, the prisms 141 focus the light from each point on the image display 81 also in Y-direction to a certain degree. Thus, the viewer can also view a stereoscopic image with both eyes aligned along Y-axis.

This structure without the mask 85 reduces the amount of light to be lost. The image display unit thus projects brighter images in the air. This structure without the mask 85 further allows the viewer to view an object behind the light guide plate 84 and the projected image.

4.3

The image projection unit 30 included in the display device according to a modification of an embodiment may yield a stereoscopic image through parallax fusion using light emitted through multiple light guide plates.

The display devices 1 to 5 and 4A according to an embodiment generate an alert in accordance with the distance from an object such as another vehicle. However, a display device according to a modification of the present disclosure may be applicable to a collision detector that generates an alert in accordance with the distance from, for example, a pedestrian. A display device according to another modification of the present disclosure may be applicable to a lane departure detector that generates an alert when the vehicle is likely to move out of its lane.

One technique of autonomous vehicle driving basically provides automated control of steering, accelerating, and braking. With this technique, the driver controls the vehicle only in emergency. A display device according to a modification of the present disclosure may be combined with this technique. The display device may alert the driver in emergency to prompt the driver to control the vehicle.

The display devices 1 to 5 and 4A according to an embodiment each are installed on the vehicle 110. However, a display device according to a modification of the present disclosure may not be installed on a vehicle, and may be used to display an alert associated with an operating state of a machine used at a factory. A display device according to another modification of the present disclosure may also be used to display an alert associated with traffic control for an expressway or a bullet train.

The display devices 1 to 5 and 4A according to an embodiment each include the image display unit 20 for displaying an image on the surface 211 of the light guide plate 21. However, a display device according to a modification of the present disclosure may further include another stereoscopic projection device, in addition to the image projection unit 30, for forming an image in a space in place of the image display unit 20. In this case, the image projection unit 30 and the other stereoscopic projection device display images with different distances between the user and the space in which each image appears. For example, the image projection unit 30 may form an image in a space nearer the user than the display device, whereas the other stereoscopic projection device may form an image in a space farther from the user than the display device.

The embodiments disclosed herein should not be construed to be restrictive, but may be modified within the spirit and scope of the claimed invention. The technical features disclosed in different embodiments may be combined in other embodiments within the technical scope of the invention.

REFERENCE SIGNS LIST

1, 2, 3, 4, 4A, 5 device
20 image display unit (second image display unit)
21 light guide plate (second light guide plate)
211 surface
22, 22a to 22e second light source
25 auxiliary display unit (second image display unit)
30 image projection unit (first image display unit, stereoscopic projection device)
31, 31a, 31b light guide plate (first light guide plate)
32, 32a to 32d LED (first light source)
110 vehicle

The invention claimed is:

1. A display device for displaying an alert image representing an alert at one of a plurality of alert levels to a user, the device comprising:
    a first image display unit configured to display a first alert image in response to an alert at a first level included in the plurality of alert levels; and
    a second image display unit configured to display a second alert image in response to an alert at a second level included in the plurality of alert levels, wherein
    the first image display unit comprises a stereoscopic projection device comprising a first light source and a first light guide plate configured to guide light from the first light source and emit the light through a light emission surface to form an image in a space,
    the second image display unit comprises a plane image display device including a second light source and a second light guide plate configured to guide light from the second light source to display an image inside the second light guide plate,
    the second light guide plate overlaps the first light guide plate, and
    the first image display unit forms the first alert image in a space different from a surface of the second image display unit.

2. The display device according to claim 1, wherein the second light source emits light into the second light guide plate in a direction orthogonal to a direction in which the first light source emits light into the first light guide plate.

3. The display device according to claim 2, wherein the display device is installed on a vehicle, and the display device displays the first alert image or the second alert image in accordance with the alert level determined in accordance with a distance between the vehicle and an object.

4. The display device according to claim 1, wherein the display device is installed on a vehicle, and the display device displays the first alert image or the second alert image in accordance with the alert level determined in accordance with a distance between the vehicle and an object.

5. The display device according to claim 1, wherein the display device is installed on a vehicle, and the display device displays the first alert image or the second alert image in accordance with the alert level determined in accordance with a distance between the vehicle and an object.

6. The display device according to claim 1, wherein the display device is installed on a vehicle, and the display device displays the first alert image or the second alert image in accordance with the alert level determined in accordance with a distance between the vehicle and an object.

7. The display device according to claim 1, wherein the first light guide plate comprises optical path changers which are arranged on a back surface parallel to the light emission surface, which emits, through the light emission surface, the light which is redirected by the optical path changers.

8. A display device for displaying an alert image representing an alert at one of a plurality of alert levels to a user, the device comprising:
    a first image display unit configured to display a first alert image in response to an alert at a first level included in the plurality of alert levels; and a second image display unit configured to display a second alert image in response to an alert at a second level included in the plurality of alert levels, wherein the first image display unit comprises a stereoscopic projection device including a first light source and a first light guide plate configured to guide light from the first light source and emit the light through a light emission surface to form an image in a first space, the second image display unit comprises a stereoscopic projection device including a second light source and a second light guide plate configured to guide light from the second light source and emit the light through a light emission surface to form an image in a second space, the second light guide plate overlaps the first light guide plate, the first image display unit forms the first alert image in the first space different from a surface of the second image display unit, and the second alert image appears in the second space different from the first space in which the first alert image appears.

9. The display device according to claim 8, wherein the display device is installed on a vehicle, and the display device displays the first alert image or the second alert image in accordance with the alert level determined in accordance with a distance between the vehicle and an object.

10. The display device according to claim 8, wherein the first light guide plate comprises optical path changers which are arranged on a back surface parallel to the light emission surface, which emits, through the light emission surface, the light which is redirected by the optical path changers.

* * * * *